United States Patent [19]

Taketani et al.

[11] 4,260,652

[45] Apr. 7, 1981

[54] PREPARATION OF PERMSELECTIVE COMPOSITE MEMBRANE

[75] Inventors: Yutaka Taketani; Yuzuru Hayashi; Takeyuki Kawaguchi; Tomoyoshi Ono; Ko Mori, all of Iwakuni, Japan

[73] Assignee: Teijin Limited, Osaka, Japan

[21] Appl. No.: 912,547

[22] Filed: Jun. 5, 1978

[30] Foreign Application Priority Data

Jun. 8, 1977 [JP] Japan .................................. 52/66601
Jun. 10, 1977 [JP] Japan .................................. 52/67847

[51] Int. Cl.$^3$ ............................ B05D 5/00; C08J 9/26; C08L 79/04
[52] U.S. Cl. .................................. 427/245; 210/490; 210/500.2; 210/506; 260/29.2 N; 521/64; 521/180
[58] Field of Search ................ 427/244, 245; 210/490, 210/500 M, 506; 521/64, 180; 260/29.6 HN, 29.2 N; 264/41, 45.8

[56] References Cited

U.S. PATENT DOCUMENTS

| | | | |
|---|---|---|---|
| 3,580,841 | 5/1971 | Cadotte et al. | 210/23 |
| 3,648,845 | 3/1972 | Riley | 210/490 |
| 3,951,815 | 4/1976 | Whasidlo | 210/500 M |
| 4,005,012 | 1/1977 | Whasidlo | 210/23 H |
| 4,039,440 | 8/1977 | Cadotte | 210/23 H |
| 4,085,090 | 4/1978 | Hara et al. | 260/49 |

FOREIGN PATENT DOCUMENTS

2524332 12/1975 Fed. Rep. of Germany.

OTHER PUBLICATIONS

Noller, Carl R., *Chemistry of Organic Compounds*, W. B. Saunders Co., Philadelphia, 1965, pp. 39–41.
Bikales, Norbert M. (editor), *Encyclopedia of Polymer Science and Technology*, Interscience Publishers, New York, vol. 7, pp. 478–505 and vol. 11, pp. 168–173, 188, 189, 204–209, 240–247, 264, 265, 464, 465, 486, 487, 494, 495, 500, and 501.
Braudrup, J., et al. (editors), *Polymer Handbook*, Interscience Publishers, New York, pp. IV-218-IV-223.

*Primary Examiner*—Evan K. Lawrence
*Attorney, Agent, or Firm*—Sherman & Shalloway

[57] ABSTRACT

A process and composition for producing a permselective composite membrane. The process comprises dissolving a specified imidazolone ring-containing aromatic polymer in an aqueous liquid medium containing a water-miscible amine having a pKa of more than 5.0 in a concentration of at least 5% by weight, coating the polymer solution on a microporous substrate, and drying the coating to form an ultrathin film on the substrate. The permselective composite membrane obtained is especially useful as a reverse osomsis membrane.

29 Claims, No Drawings

PREPARATION OF PERMSELECTIVE COMPOSITE MEMBRANE

BACKGROUND OF THE INVENTION

This invention relates to a process and composition for producing a permselective composite membrane. The permselective composite membrane is composed of a supported ultrathin film of a certain polybenzimidazolone which has superior water flux and salt rejection properties and finds a particularly advantageous use as a reverse osmosis membrane.

The permselective membrane is a membrane which has selective permeability to specified molecules. It is frequently used to remove very small amounts of contaminated molecules dissolved or diffused in a liquid or gas.

In recent years, reverse osmosis has attracted a great deal of interest for utilization in fields involving purification of liquids. This is of especial importance when utilizing this system in the purification of water and brackish water. Likewise, the process is also used to remove impurities from liquids such as water or, in the fields of dialysis, blood. When utilizing reverse osmosis in the purification of a brackish water, a pressure in excess of the osmotic pressure of the brackish water feed solution is applied to the solution which is prepared from purified water by a semipermeable membrane. Pure water thereby diffuses through the membrane while the sodium chloride molecules or other impurities which may be present in the water are retained by the membrane.

The efficiency of the reverse osmosis method is greatly affected by the properties of the permselective membrane used. Much effort has therefore been made to develop membranes having high performance, and resulted in some specific suggestions.

For example, U.S. Pat. Nos. 3,133,132 and 3,133,137 disclose the early Loeb-type membranes made of cellulose diacetate. These membranes are asymmetric membranes which are characterized by a very thin, dense surface layer or skin that is supported upon an integrally attached, much thicker supporting layer. These known membranes based on cellulose diacetate have the defect of poor compaction, low resistance to chemical and biological degradation, a short useful life, and insufficient flux and salt rejection characteristics.

U.S. Pat. No. 3,580,841 suggests an ultrathin semipermeable reverse osmosis membrane consisting of a cellulose acetate having a thickness between 0.05 and 0.50 micron.

Further, U.S. Pat. No. 3,648,845 suggests a process for making a thin semipermeable membrane composed of cellulose acetate which comprises depositing a film-forming solution of cellulose acetate in an organic solvent on a substantially non-porous buffer layer of polyacrylic acid coated on a microporous substrate, evaporating off the solvent, and at least partially removing the buffer layer by leaching. The membranes suggested in these U.S. Patents are also based on cellulose acetate, and cannot be free from the defect of poor compaction, low resistance to chemical and biological degradation, short useful life and insufficient flux and salt rejection characteristics as the membranes described hereinabove. The method of the last-cited U.S. Patent further requires a complicate procedure of pre-coating a buffer layer on a microporous substrate and then leaching the coating.

U.S. Pat. No. 3,587,832 suggests a permselective membrane based on a nitrogen-containing polymer which includes, for example, wholly aromatic polyamides and polyhydrazide. Typical examples of the nitrogen-containing polymer disclosed in this U.S. Patent are (meta-phenylene isophthalamide-terephthalamide) copolymer, and poly(isophthalic hydrazide). Permselective membranes obtained from these polymers are neither satisfactory in regard to salt rejection characteristics and chemical resistance.

In an attempt to remove these defects of the Loeb-type membranes, some membranes composed basically of synthetic polymers have recently been suggested. For example, U.S. Pat. No. 3,951,815 discloses a composite semipermeable membrane comprising a microporous substrate and an ultrathin film formed of a crosslinked, grafted polyethylenimine disposed on one surface of the microporous substrate that has been crosslinked with a di-or or tri-functional compound such as isophthaloyl chloride and grafted with a graft reactant such as acrylonitrile or epichlorohydrin. U.S. Pat. No. 4,005,012 describes a composite semipermeable membrane comprising an ultrathin film formed by contacting an amine-modified polyepihalohydrin with a polyfunctional agent on a microporous substrate to form this film on one surface of the microporous substrate. Also, U.S. Pat. No. 4,039,440 discloses a reverse osmosis membrane prepared in situ on a porous support by initial formation of a layer of polyethylenimine on the support, followed by interfacial reaction with a polyfunctional reagent to produce a thin surface coating which possesses salt barrier characteristics.

The membrane composed basically of crosslinked polyethylenimine disclosed in U.S. Pat. No. 4,039,440 has a high salt rejection, but has the defect of insufficient water flux and low oxidation resistance (e.g., low resistance to deterioration by the presence of chlorine in the feed saline or brackish water). As one method of improving the oxidation resistance, U.S. Pat. No. 3,951,815 suggests the grafting of acrylonitrile to the polyethylenimine. The acrylonitrile-grafted and crosslinked polyethylenimine shows some improvement in oxidation resistance, but suffers from the serious defect of markedly reduced water flux.

The membrane composed basically of the amine-modified polyepihalohydrin disclosed in U.S. Pat. No. 4,005,012 exhibits a high salt rejection but its water flux is not sufficient. It has been strongly desired therefore, to develop membranes having a higher water flux.

Basically the characteristics required of permselective membranes are high levels of permselectivity and flux. In addition, they should have high resistance to compaction, superior resistance to chemical and biological degradation, and sufficient flexibility to endure shaping into modules in actual use such as a tube, spiral or hollow filament. The membranes so far suggested lack one or more of these characteristics, and are not entirely satisfactory for use as permselective membranes.

Accordingly, the art has strongly desired to develop membranes having a combination of the aforesaid desired characteristics.

The present inventors previously discovered a nitrogen-containing aromatic polymer containing in the main chain of the polymer a nitrogen-containing cyclic group of the following formula

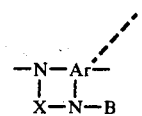
(a)

wherein Ar represents an aromatic group, the two nitrogen atoms bonded to Ar being bonded to the ring carbon atoms at the ortho-position of the aromatic group; B represents a hydrogen atom or a bond to X in which case X is doubly bonded to N; and X represents an atomic grouping which forms a 5- or 6-membered ring together with the two nitrogen atoms and the two carbon atoms at the ortho-position of Ar to which the first two nitrogen atoms are handled, such as

and disclosed that this polymer and a thin film prepared from it have superior permselectivity, and the nitrogen-containing aromatic polymer would be acceptable as a permselective membrane (see German Offenlegungsschrift No. 2524332) which corresponds to U.S. Pat. No. 4,085,090 to Hara et al.

The present inventors furthered their investigation into possible uses of the aforesaid nitrogen-containing aromatic polymers as permselective membranes, and consequently found that a membrane prepared from a specified imidazolone ring-containing aromatic polymer within the definition of the above-mentioned nitrogen-containing aromatic polymers has excellent permselectivity and high flux properties and also possess high resistance to compaction, superior resistance to chemical and biological degradation and sufficient flexibility to endure shaping into modules in actual use such as a tube, spiral or hollow filament, and is very suitable as a permselective membrane. The imidazolone ring-containing aromatic polymer is the one comprising at least 30 mole %, based on the entire recurring units, of at least one recurring unit of the following formula

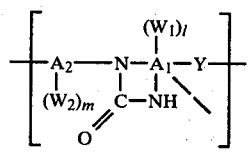
(I)

wherein $A_1$ is an aromatic group having a valence of $(3+l)$ the dashed line represents the presence or absence of a bond, and the two nitrogen atoms and $W_1$ are all bonded to the ring carbon atoms of the aromatic group $A_1$; $A_2$ is an aromatic group having a valence of $2+m$); Y is —O— or

in which $R_1$ is a hydrogen atom or a monovalent hydrocarbon residue; and the two nitrogen atoms bonded to $A_1$ are bonded to the nuclear carbon atoms at the ortho-position of the aromatic group $A_1$; $l$ and $m$ are identical or different and each represent an integer of 0 to 3; when Y is

and one of $W_1$ groups is bonded to the nuclear carbon atom at the ortho-position of the aromatic group $A_1$ together with Y, the $W_1$, Y and $A_1$ can form a 5-membered ring same as

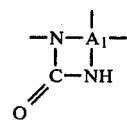

in which all symbols are the same as defined above; and when $W_1$ does not form the 5-membered ring, $W_1$ and $W_2$ are identical or different and represent at least one group selected from mono-substituted nitrogen-containing groups derived from a primary amino group.

As is described in the above-cited prior art references, a permselective membrane for a reverse osmosis method is usually used in the form of a self-supporting anisotropic membrane, a laminate membrane obtained by laminating a self-supporting isotropic thin film to a microporous substrate, or a composite membrane consisting of a permselective ultrathin polymeric film supported on a microporous substrate. In the reverse osmosis method, a considerably high pressure of several $kg/cm^2$ to several tens of $kg/cm^2$ is usually exerted on the membrane. Accordingly, the anisotropic membrane or laminate membrane breaks during the operation or is compacted, leading to a marked reduction in flux. In order to remove this defect, attempts are frequently made to coat a microporous substrate having relatively high permeability to water with a solution of a polymer that gives permselectivity thereby to deposit an ultrathin film and provide a permselective composite membrane.

The present inventors, too, attempted to produce a permselective composite membrane by using a solution of the imidazolone ring-containing aromatic polymer. However, the amide solvents, such as N-methyl pyrrolidone, N-methyl caprolactam, N,N-dimethyl acetamide, hexamethyl phosphoramide or tetramethylurea, sulfoxide solvents such as dimethyl sulfoxide, and phenolic solvents such as phenol, cresol or chlorophenol, which are disclosed in the above-cited German OLS No. 2524332 as solvents capable of dissolving this aromatic polymer, dissolve most of the microporous substrates heretofore used as supports for permselective composite membranes and as ultrafiltration materials. Hence, it is impossible to coat a solution of the polymer in such a solvent directly on the substrate, and these solvents have been found to be useless in the production of permselective composite membranes.

Furthermore, the present inventors attempted to form an ultrathin film by coating a solution of the imidazolone ring-containing aromatic polymer in the aforesaid solvent on a microporous substrate which has been previously coated with a substantially nonporous buffer layer of polyacrylic acid in accordance with the method suggested in U.S. Pat. No. 3,648,845 cited above. However, the buffer layer was attacked by the solvent, and they failed to produce a satisfactory permselective composite membrane.

With a view to providing a permselective composite membrane having a supported ultrathin film of the imidazolone ring-containing aromatic polymer by coating a solution of the polymer on a microporous substrate, the present inventors extensively worked on solvents which would sufficiently dissolve the imidazolone ring-containing aromatic polymer without substantially dissolving the microporous substrate. Surprisingly, these efforts have led to the discovery that an aqueous medium containing a water-miscible amine having a pKa of more than 5.0 in a concentration of at least 5% by weight readily dissolves the imidazolone ring-containing aromatic polymer, but does not substantially dissolve the microporous substrate.

The term pKa, as used in the present specification and the appended claims, denotes a constant which characterizes the dissociation of a base to its conjugate acid in water at 25° C. A detailed description of pKa is found, for example, in D. D. Perrin, "Dissociation Constants of Organic Bases in Aqueous Solution", Butterworths, London (1965).

SUMMARY OF THE INVENTION

Thus, according to this invention, there is provided a process for producing a permselective composite membrane, which comprises dissolving an imidazolone ring-containing polymer in an aqueous liquid medium containing a water-miscible amine having a pKa of more than 5.0 in a concentration of at least 5% by weight to form a solution containing the polymer in a concentration of 0.01 to 20.0% by weight, the polymer comprising at least 30 mole %, based on the entire recurring units, of at least one recurring unit of the following formula

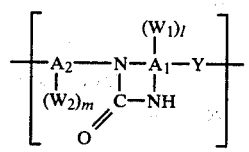
(I)

wherein $A_1$ represents an aromatic group having a valence of $(3+l)$, the dashed line represents the presence or absence of a bond, and the two nitrogen atoms and $W_1$ are all bonded to the ring carbon atoms of the aromatic group $A_1$; $A_2$ represents an aromatic group having a valence of $(2+m)$; Y is —O— or

in which $R_1$ is a hydrogen atom or a monovalent hydrocarbon residue; and the two nitrogen atoms bonded to $A_1$ are bonded to the ring carbon atoms at the orthoposition of the aromatic group $A_1$; l and m are identical or different and each represent an integer of 0 to 3; when Y is

and one of $W_1$ groups is bonded to the ring carbon atom at the ortho-position of the aromatic group $A_1$ together with Y, the $W_1$, Y and $A_1$ can form a 5-membered ring same as

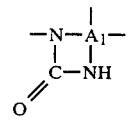

in which all symbols are the same as defined above; and when $W_1$ does not form the 5-membered ring, $W_1$ and $W_2$ are identical or different and represent at least one group selected from mono-substituted nitrogen-containing groups derived from the primary amino group;

coating the resulting polymer solution on a microporous substrate; and drying the coating to form an ultrathin film of the polymer on the microporous substrate.

The invention will be described in greater detail below.

DESCRIPTION OF THE PREFERRED EMBODIMENTS

In the present invention, the aromatic polymer comprising at least one recurring unit of formula (I) containing an imidazolone ring is used to provide a permselective composite membrane.

In formula (I), the aromatic group represented by $A_1$ may contain at least one, preferably 1 to 4, most preferably 1 or 2, benzene ring or naphthalene ring, especially the former as an aromatic ring. When it contains two or more such aromatic rings, the aromatic rings may be directly bonded as shown by the following formula

(VI)

wherein $Ar^1$, $Ar^2$ and $Ar^3$ are identical or different, and each represent aromatic rings such as those exemplified above, and a is 0 or an integer of at least 1, and when a is 0, $Ar^1$ and $Ar^3$ are directly bonded to each other. Or these aromatic rings may be bonded to each other through bridging members ($Z_1$, $Z_2$) as shown by the following formula

(VIII)

wherein $Ar^1$, $Ar^2$ and $Ar^3$ are identical or different, and each represent aromatic rings such as those exemplified above, $Z_1$ and $Z_2$ are identical or different and represent bridging members, and a is 0 or an integer of at least 1, and when a is 0, $Ar^1$ and $Z_2$ are directly bonded.

Alternatively some aromatic rings may be directly bonded, and some others may be bonded through a bridging member. Examples of the bridging members that can exist are —O—, —SO$_2$—, —CO—, —CH$_2$—, and

Among them, —SO$_2$— and —CO— are preferred, and —SO$_2$— is especially preferred.

The aromatic ring in $A_1$ preferably does not contain substituents other than $W_1$. If desired, however, it may contain at least one, up to 4, preferably 1 or 2, inert substituent such as a lower alkyl group, or a lower alkoxy group.

In the present specification and the appended claims, the term "lower" means that groups modified by this term contain 1 to 5, preferably 1 to 3, carbon atoms. The lower alkyl groups may be linear or branched, and include, for example, methyl, ethyl, n- or iso-propyl, n-, iso-, sec- or tert-butyl. Examples of the lower alkoxy groups include methoxy, ethoxy and n- or iso-propoxy groups.

Advantageously, the aromatic group $A_1$ having a valence of (3+1) contains 6 to 20 carbon atoms, preferably 6 to 15 carbon atoms, most preferably 6 to 12 carbon atoms.

Suitable substituents $W_1$ that may be present on the aromatic group $A_1$ are:

(i) $-NH-\underset{\underset{O}{\|}}{C}-R_{12}$, (ii) $-NH-SO_2-R_{13}$, (iii) $-NH-\underset{\underset{O}{\|}}{CO}-R_{14}$, and (iv) $-NH-\underset{\underset{O}{\|}}{C}-NH-R_{15}$.

In the above formulae (i) to (iv), $R_{12}$ and $R_{15}$ are identical or different and each represent a hydrogen atom or an organic group containing 1 to 10 carbon atoms and in principle having a valence of 1 (which may partly contain a group having a valence of 2 to 4); $R_{14}$ is organic group containing 1 to 20 carbon atoms and in principle having a valence of 1; $R_{13}$ is an organic group containing 1 to 20 carbon atoms and in principle having a valence of 1, or a hydroxyl group; $R_{12}$, $R_{13}$, $R_{14}$ and $R_{15}$ are preferably alkyl or alkylene groups containing 1 to 8 carbon atoms, or monovalent aromatic groups composed mainly of a benzene ring with 6 to 15 carbon atoms. Suitable $R_{12}$, $R_{14}$ and $R_{15}$ groups are residues of benzimidazolone-forming or benzimidazole-forming reagents to be described hereinbelow.

Advantageously, such a substituent $W_1$ is not present (i.e., $l$ is 0), or only one substituent $W_1$ is present (i.e., $l$ is 1).

Y is $-O-$, or $$-\underset{\underset{R_1}{|}}{N}-$$

in which $R_1$ is a hydrogen atom or a monovalent hydrocarbon residue. A lower alkyl group, especially the one having 1 to 3 carbon atoms, is suitable as the monovalent hydrocarbon groups. The group $$-\underset{\underset{H}{|}}{N}-$$

is especially preferred as Y. It is especially preferred that the group $$-\underset{\underset{H}{|}}{N}-$$

forms a 5-membered ring same as

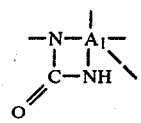

in formula (I) above together with one of the groups $W_1$ which is bonded to the ring carbon atom at the ortho-position to

of the aromatic group $A_1$.

Desirably, at least one, advantageously substantially all, of the groupings of the formula

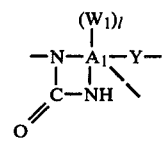 (b)

is in the form expressed by the following formula

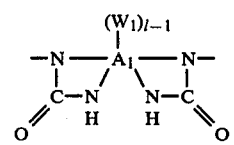 (c)

Specific examples of groupings expressed by formulae (b) and (c) are given below.

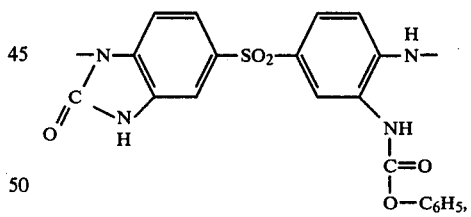 (b)

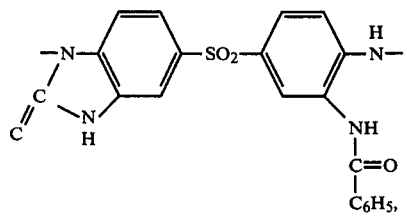

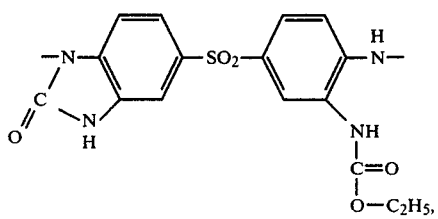

-continued
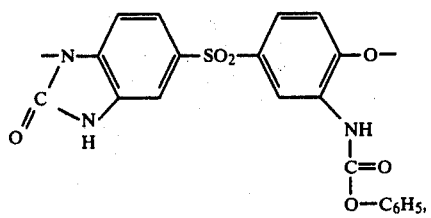
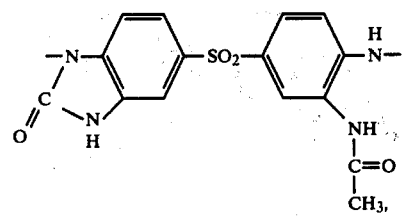
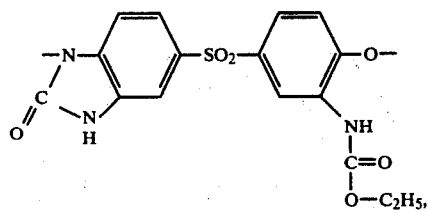
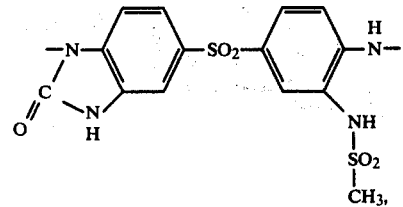
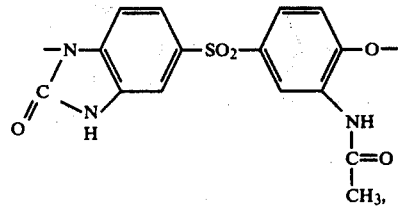
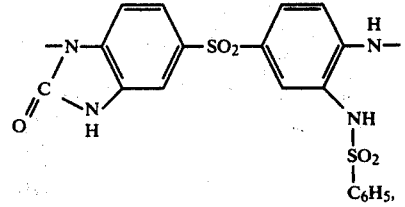
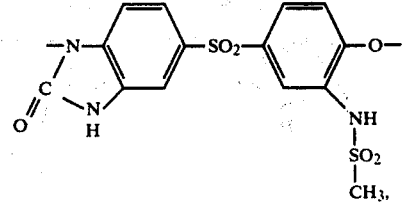
-continued
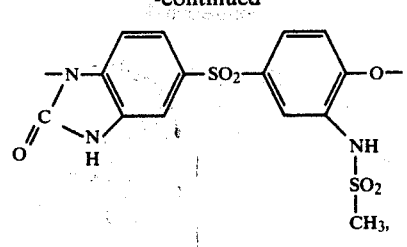
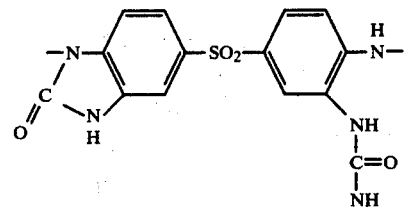
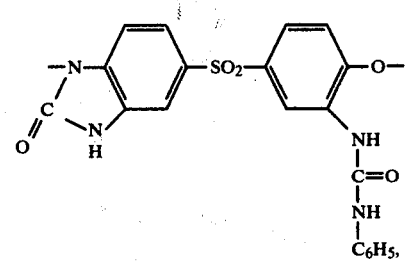
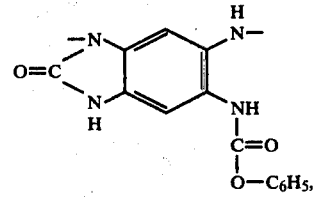
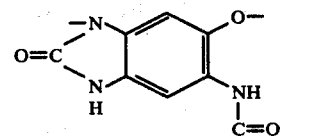
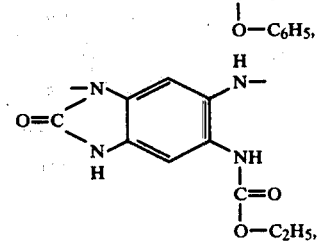
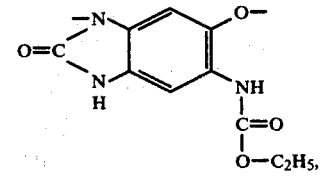
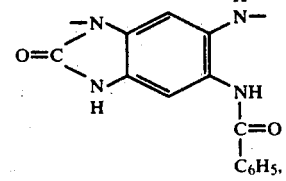

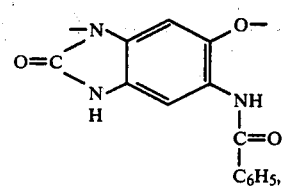
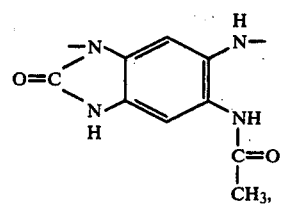
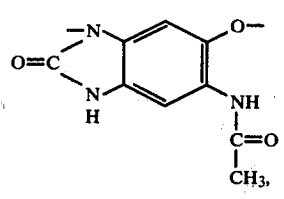
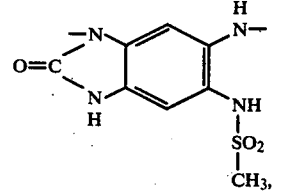
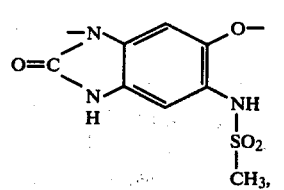
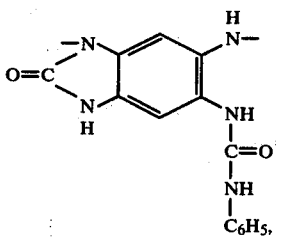
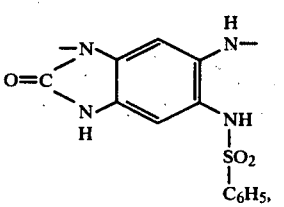
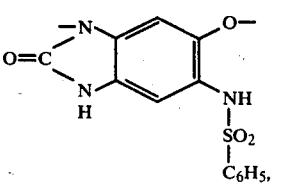
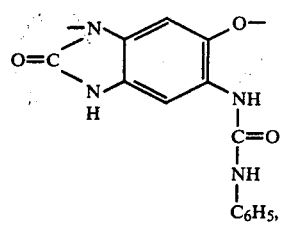
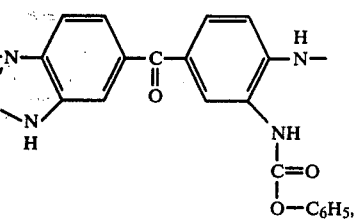
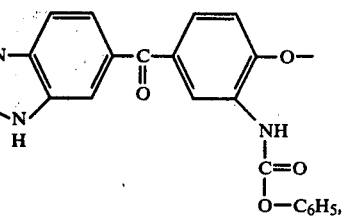
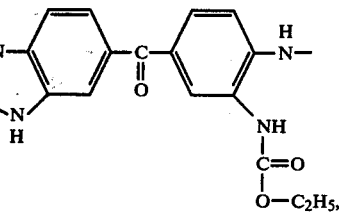
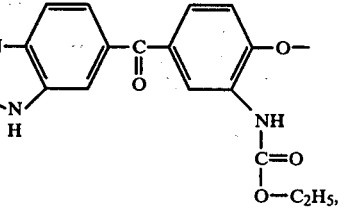
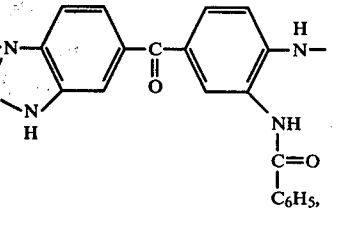
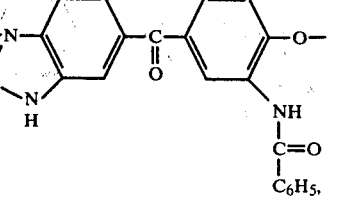

-continued
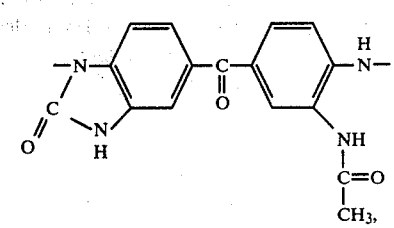
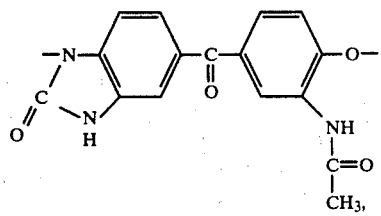
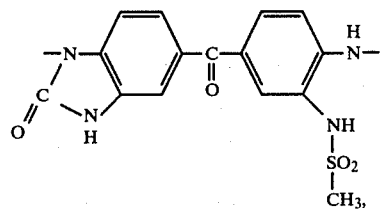
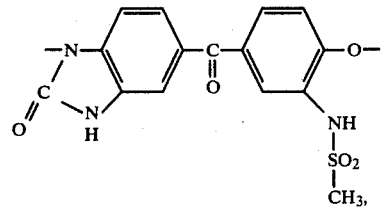
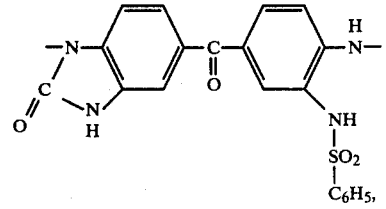
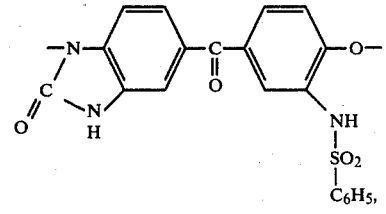
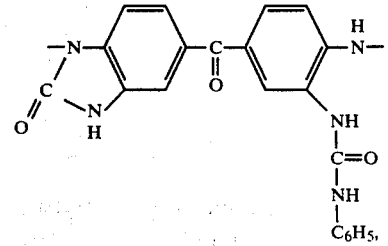
-continued
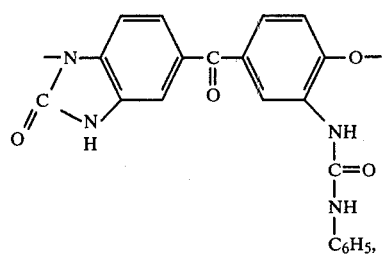
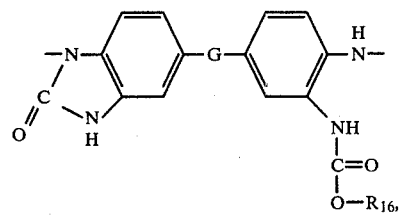
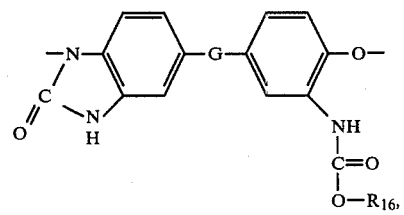
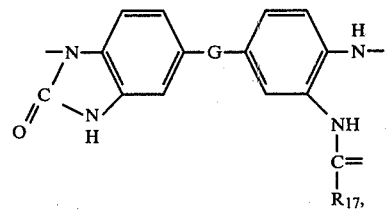
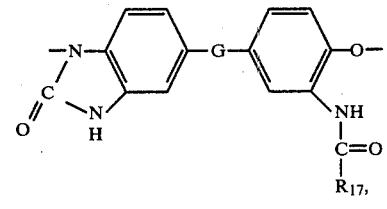
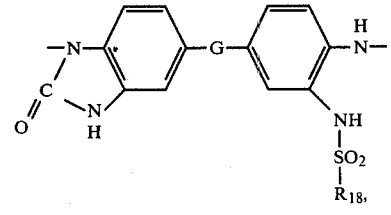
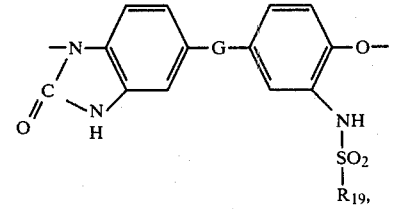

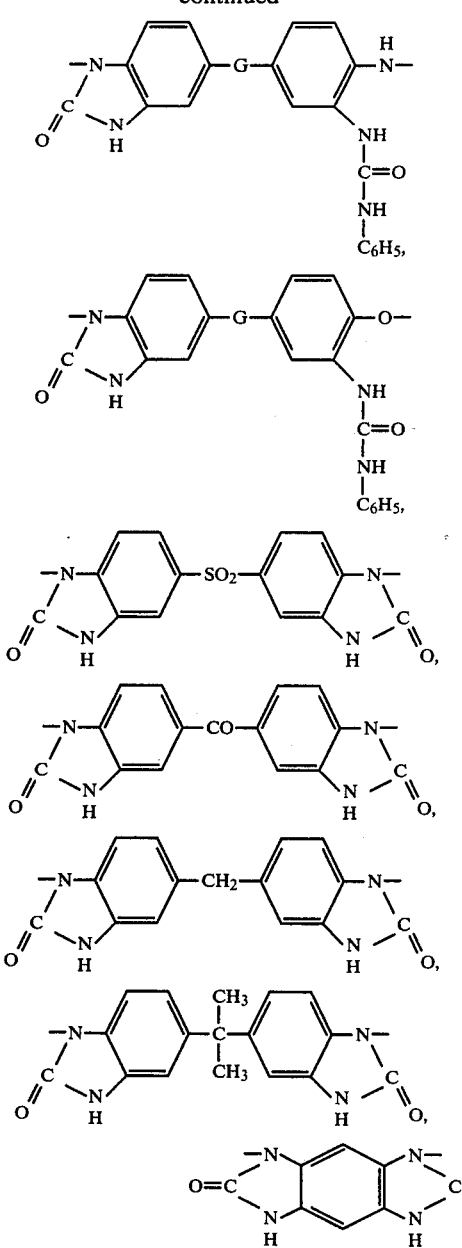

G is —CH$_2$—,

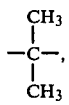

or a direct bond. R$_{16}$, R$_{17}$, R$_{18}$ and R$_{19}$ each represent a lower alkyl group such as methyl or ethyl, or a phenyl group optinally substituted by a lower alkyl group such as methyl.

These recurring units may be present singly or as a combination of two or more.

In formula (I), the aromatic group having a valence of (2+ m) expressed by A$_2$ may contain at least 1, preferably 1 to 4, most preferably 1 or 2, benzene ring or naphthalene ring as an aromatic ring, especially the former. When it contains two or more of these aromatic rings, these aromatic rings may be directly bonded as shown by formula (VI), or bonded through bridging members as shown by formula (VII). Alternatively, some of the aromatic rings may be directly bonded, and the other, through bridging members. Examples of the bridging members that can exist in A$_2$ are the same as those given for A$_1$. Among them, —O—, lower alkylene groups such as —CH$_2$— or

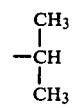

are preferred.

In addition to W$_2$, the aromatic ring of A$_2$ may contain at least one inert substituent such as a lower alkyl group, a lower alkoxy group, a carboxyl group or a sulfo group, especially the lower alkyl group, carboxyl group or sulfo group. The number of such inert substituents is up to 4, preferably 1 or 2. Substituent W$_2$ that can exist on the aromatic group A$_2$ may be those groups which are exemplified hereinabove with regard to W$_1$. It is desirable that W$_2$ should not be present, or only one W$_2$ whould be present (i.e., m should be 0 or 1).

Suitable aromatic groups A$_2$ are those having 6 to 20 carbon atoms, preferably 6 to 15 carbon atoms, most preferably 6 to 13 carbon atoms.

Specific examples of the grouping of formula

(d) in formula (I) are listed below.

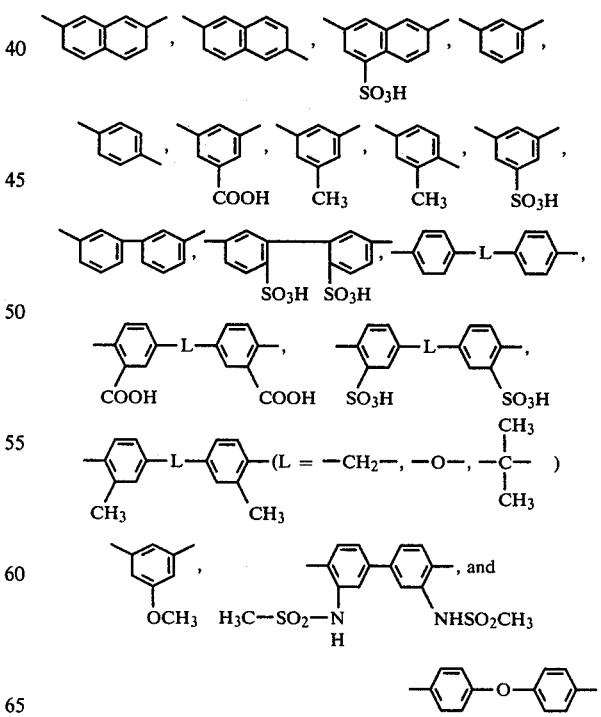

The recurring unit of formula (I) is preferably the one at least a part of which, preferably substantially all of which, consists of a recurring unit of the following formula

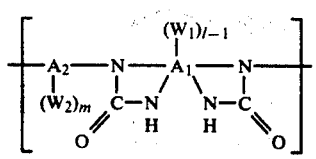   (I-A)

wherein $A_1$, $A_2$, $W_1$, $W_2$, $l$ and $m$ are the same as defined in formula (I), with the proviso that $l-1 \geqq 0$.

An especially preferred recurring unit is expressed by the following formula

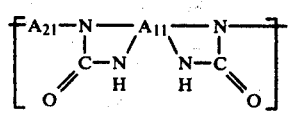   (I-B)

wherein $A_{11}$ is a member selected from the group consisting of

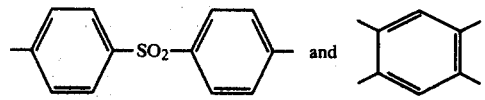

and $A_{21}$ is a member selected from the group consisting of

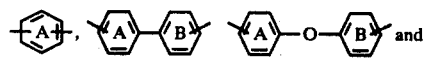 and

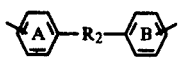

in which $R_2$ is a lower alkylene group, and the benzene ring A and/or B is optionally substituted by at least one (preferably up to two) member selected from the group consisting of lower alkyl, carboxyl and sulfo groups.

Typical examples of the recurring units (I-A) and (I-B) are given below.

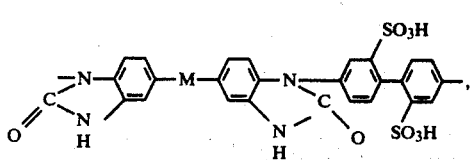

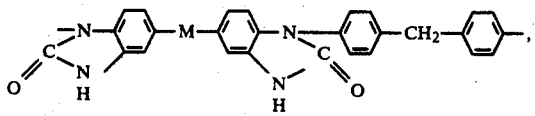

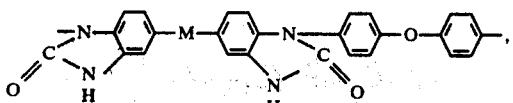

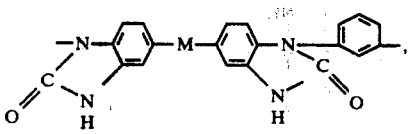

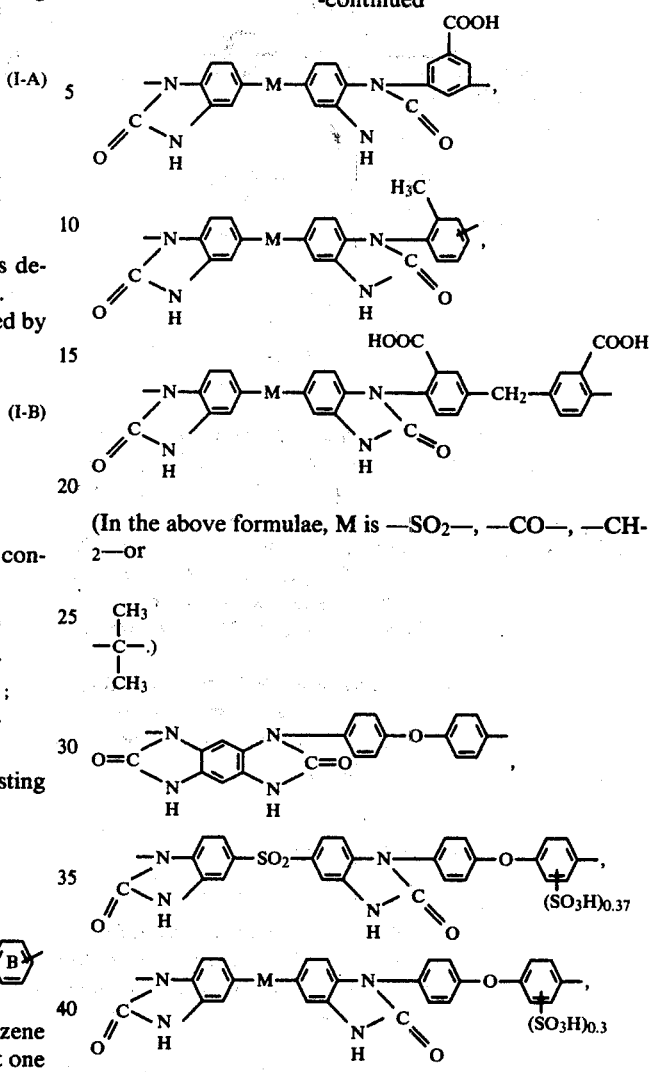

(In the above formulae, M is $-SO_2-$, $-CO-$, $-CH_2-$ or $$-\underset{\underset{CH_3}{|}}{\overset{\overset{CH_3}{|}}{C}}-\ .)$$

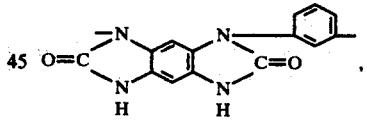

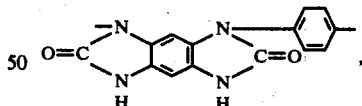

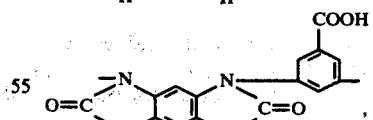

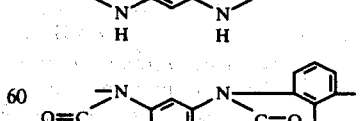

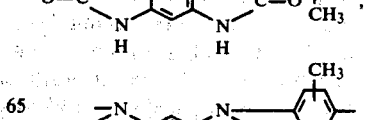

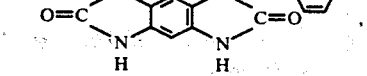

-continued

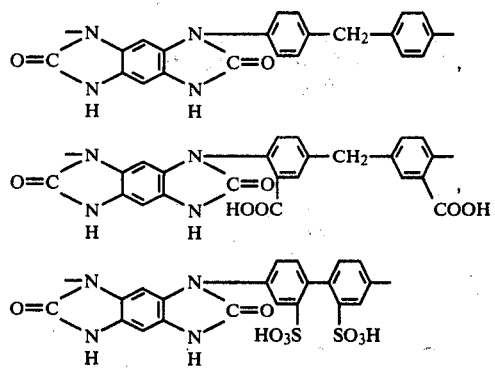

The imidazolone ring-containing aromatic polymer used in this invention contains at least 30 mole %, preferably at least 50 mole %, most preferably at least 80 mole %, based on the entire recurring units in the polymer, of the recurring unit of formula (I) (preferably a part or substantially all of which consists of the recurring unit of formula (I-A) or (I-B)). Thus, the polymer may consist substantially 100 mole % of the recurring unit of formula (I).

The polymer may contain up to 70 mole % (i.e., 0 to 70 mole %), based on the entire recurring units, of an unsubstituted or substituted amino-containing recurring unit of the following formula

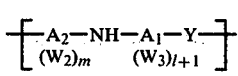  (II)

wherein $A_1$, $A_2$, Y, $W_2$, l and m are the same as defined with regard to formula (I); and $W_3$ represents at least one group selected from the class consisting of monosubstituted nitrogen-containing groups derived from a primary amino group.

In formula (II), the group $W_3$ is the same as described with regard to $W_1$ in formula (I).

Among the recurring units of formula (II), those of the following formula are especially preferred.

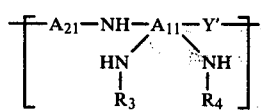  (II-A)

wherein $A_{11}$ and $A_{21}$ are the same as defined with regard to formula (I-B); $R_3$ and $R_4$ each represent —COOR$_5$, —SO$_2$R$_5$, —COR$_5$ and —CONH—R$_5$ in which $R_5$ represents an organic group having up to 15 carbon atoms, and Y' represents —O— or —NH—.

In formula (II-A), suitable organic groups $R_5$ contain up to 15, preferably 1 to 10, carbon atoms. Specific examples are lower alkyl groups such as methyl, ethyl, n- or iso-propyl, and n-, iso-, sec- or tertbutyl; aryl groups such as phenyl, tolyl or xylyl; aralkyl groups such as benzyl or phenetyl; and cycloalkyl groups such as cyclohexyl. Of these, lower alkyl, phenyl, and tolyl are especially preferred.

Typical examples of the recurring units of formula (II), preferably (II-A), are as follows:

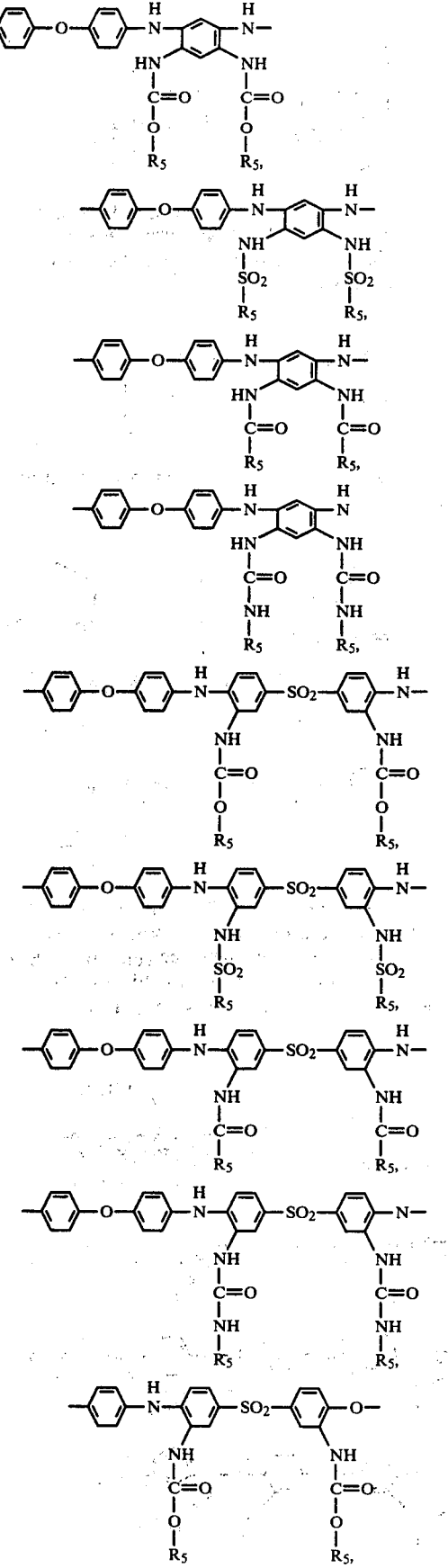

-continued

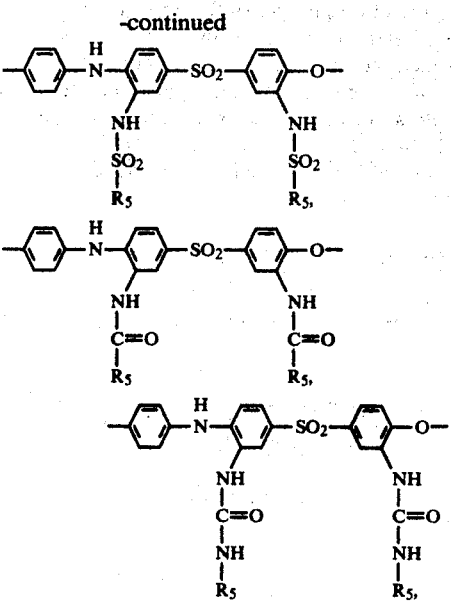

(R₅ is same as defined above.)

These recurring units may be present singly or as a combination of two or more.

The total proportion of the recurring unit of formula (I) and the recurring unit of formula (II) may be at least 80 mole %, preferably at least 90 mole %, most preferably 95 to 100 mole %, based on the entire recurring units. The remainder (up to 20 mole %, preferably up to 10 mole %, most preferably 0 to 5 mole %) may consist of a third recurring unit. A suitable third recurring unit is the one expressed by the following formula

   (III)

wherein $A_3$ and $A_4$ are identical or different, and each represent an organic group having a valence of 2 to 4; and $Q_1$ and $Q_2$ are identical or different and represent a group selected from the class consisting of

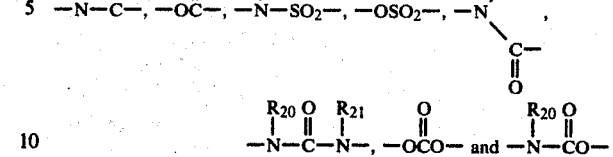

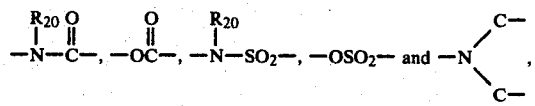

in which $R_{20}$ and $R_{21}$ are identical or different and each represent a hydrogen atom, a monovalent or divalent hydrocarbon residue or a mere bond, with the proviso that when these groups represent a divalent hydrocarbon residue or a bond, they can be bonded to $A_3$ or $A_4$, or $R_{20}$ and $R_{21}$ may be bonded to each other.

$A_3$ and $A_4$ are generally the same in definition as

and the preferred species are also the same. Especially preferred species of $Q_1$ and $Q_2$ are groups

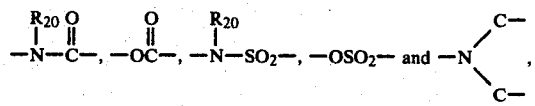

especially the group

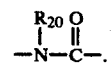

Preferred species of $R_{20}$ and $R_{21}$ are a hydrogen atom or a lower alkyl or alkylene group containing 1 to 2 carbon atoms.

Typical examples of the recurring unit of formula (III) are given below.

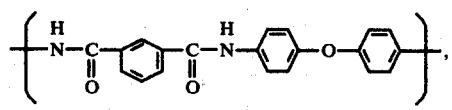

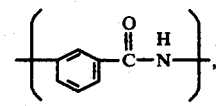

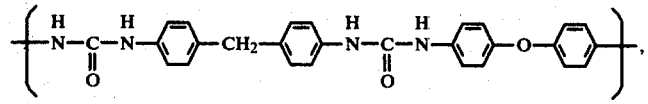

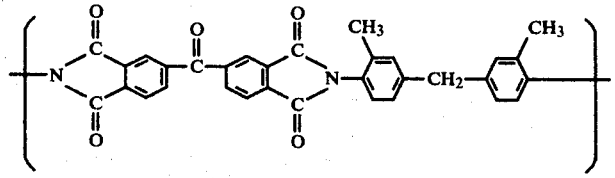

The molecular weight of the imidazolone ring-containing aromatic polymer used in accordance with this invention is not restricted within a narrow range, but can be selected from a wide range. Generally, it is advantageous that the polymer has an inherent viscosity, measured in an N-methyl pyrrolidone solution at 0.5 g/100 ml at 30° C., of at least 0.1, preferably 0.3 to 2.5, most preferably 0.4 to 2.0

The process for producing the imidazolone ring-containing aromatic polymer used in this invention is described in detail in the specification of the above-cited German OLS 2524332, and in the present specification, the specification of the German OLS is cited as the description of the process for polymer preparation.

The greatest characteristic of the present invention consists in the use of "an aqueous liquid medium containing a water-miscible amine having a pKa of more than 5.0 in a concentration of at least 5% by weight" as a solvent for dissolving the imidazolone ring-containing aromatic polymer described hereinabove.

The term "water-miscible", as used herein, generally denotes the ability of a certain compound to mix with water at any desired ratios at room temperature, and also exceptionally refers to the ability of a certain compound, such as triethylamine, to mix with water at a relatively low temperature of, say, 18° C. or below.

In the present invention, the use of water-miscible amines having a pKa of 5.1 to 12, advantageously 5.2 to 11.0, is desirable.

The amine which has the specified pKA value and is water-miscible may be a gas or liquid. Generally, it is preferred to choose it from aliphatic amines and pyridines expressed by the following formulae (IV) and (V).

$$\begin{array}{c} R_7 \\ | \\ R_6-N-R_8 \end{array} \quad (IV)$$

wherein $R_6$, $R_7$ and $R_8$ are identical or different and each represent a hydrogen atom, a lower alkyl group, a lower hydroxyalkyl group, or the group

in which $R_9$ and $R_{10}$ each represent a lower alkylene group, k is an integer of 1 to 6, and l is 0 or an integer of 1 to 3; and when k is at least 2, the recurring units

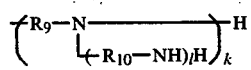

may be identical or different, with the proviso that at least one of $R_6$, $R_7$ and $R_8$ represents the groups other than hydrogen.

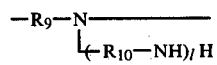

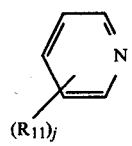

wherein $R_{11}$ represents a member selected from the group consisting of lower alkyl groups, lower alkoxy groups and amino groups (especially a primary amino group), and j is 0 or an integer of 1 to 4, preferably 0, 1 or 2.

Specific examples of the aliphatic primary, secondary or tertiary amines of formula (IV) include monomethylamine, dimethylamine, trimethylamine, monoethylamine, diethylamine, triethylamine, monoethanolamine, diethanolamine, ethylenediamine, propylene diamine, $H_2N-CH_2-CH_{2H}N-CH_2CH_2NH_2$, $H_2NCH_2CH_2NH-CH_2-CH_2NHCH_2CH_2NH_2$, $$\begin{array}{c} H \\ NH_2-CH_2CH_2N-CH_2CH_2NCH_2CH_2NH_2, \\ | \\ CH_2CH_2NH_2 \end{array}$$

$$NH_2-CH_2-CH_2-N-CH_2CH_2NCH_2CH_2NH_2, \text{ and}$$
$$\begin{array}{cc} | & | \\ CH_2CH_2NH_2 & CH_2CH_2NH_2 \end{array}$$

$$\begin{array}{c} H \\ NH_2-CH_2-CH_2-N-CH_2-CH_2-N-CH_2CH_2N-CH_2CH_2NH_2. \\ | \quad\quad\quad H \\ CH_2CH_2NH_2 \end{array}$$

Examples of the pyridines of formula (V) are

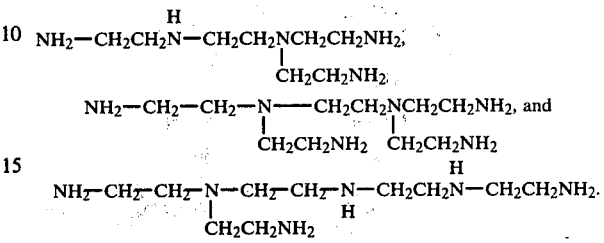

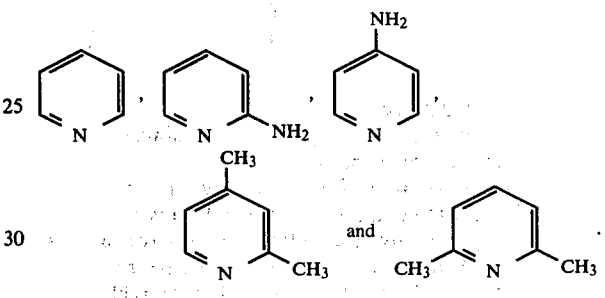

Of these amines, monomethylamine, dimethylamine, trimethylamine, monoethylamine, diethylamine, triethylamine, monoethanolamine, diethanolamine, ethylenediamine, propylenediamine, diethylenetriamine, triethylenetetramine, pyridine, 2-aminopyridine, 4-aminopyridine, 2,4-dimethylpyridine, and 2,6-dimethylpyridine are preferred. Among them, ethylamine, diethylamine, ethylenediamine, propylenediamine, and pyridine are especially preferred.

These amines can be used either singly or as a mixture of two or more.

Amines that can be advantageously used in this invention have a boiling point of not more than 200° C., preferably not more than 140° C., and a molecular weight of not more than 250, preferably 31 to 100.

The concentration of the water-miscible amine in the aqueous liquid medium used in this invention should be at least 5% by weight. The preferred concentration of the amine depends upon the type of the amine, and is not restricted within a narrow range. Generally, the concentration is 10 to 90% by weight, preferably 15 to 85% by weight, more preferably 20 to 75% by weight.

The remainder of the aqueous liquid medium may consist substantially of water. If desired, however, the aqueous liquid medium may further comprise an aprotic polar organic solvent. It has been found that a greater effect can be obtained in this invention by including an aprotic polar organic solvent in such a small amount as will not substantially dissolve the microporous substrate, preferably at most 15% by weight, more preferably up to 13% by weight, more preferably up to 10% by weight. When an aprotic polar organic solvent is used, the lower limit of its amount is not critical, and can be varied according to the type of the aprotic polar organic solvent used, etc.

The term "aprotic polar organic solvent", as used in the present specification and the appended claims, denotes an organic solvent which does not contain active hydrogen and has a strong polarity. Examples of such a solvent are amides such as N-methylpyrrolidone, N-methylcaprolactam, N,N-dimethyl formamide, N,N-dimethyl acetamide and hexamethylphosphoramide; urea derivatives such as tetramethyleneurea; organic sulfoxides such as dimethyl sulfoxide; and organic sulfones such as tetramethylene sulfone. Of these, N,N-dimethyl formamide and dimethyl acetamide are especially suitable. These aprotic polar solvents may be used singly or as a mixture of two or more.

Advantageously, the aprotic polar organic solvent used in this invention has a boiling point of generally at least 140° C., preferably 145° to 240° C. Preferably, its boiling point is higher than that of the water-miscible amine solvent described hereinabove.

According to this invention, the imidazolone ring-containing aromatic polymer is dissolved in the aqueous liquid medium containing the water-miscible amine and optionally the aprotic polar organic solvent. The amount of the aromatic polymer to be dissolved in the aqueous medium can be varied widely according, for example, to the type of the medium and the polymer, and the amount of the polymer deposited on the microporous substrate. Advantageously, the amount is generally 0.01 to 20% by weight, preferably 0.05 to 15% by weight, more preferably 0.1 to 10% by weight.

The polymer solution can be easily prepared by adding the aromatic polymer to the aqueous liquid medium and stirring the mixture at room temperature in a customary manner. When the dissolving of the aromatic polymer is slow, the mixture may be heated to promote dissolution.

The polymer solution so prepared is coated on a microporous substrate in order to obtain a permselective composite membrane.

The microporous substrate that can be used in this invention may be any of those which have heretofore been used as supports for permselective composite membranes or ultrafiltration materials. Conveniently, the microporous substrate has a maximum pore diameter at the surface of not more than 5000 Å, preferably not more than 3500 Å, and preferably has a surface pore diameter within the range of about 100 to about 3000 Å.

The thickness of the microporous substrate is not critical, and can be varied over a wide range. Generally, it is 25 to 1000 microns, preferably 30 to 500 microns.

The substrate may be of an isotropic structure or an anisotropic structure, desirably of the latter. When the membrane constant of the substrate is less than $10^{-6}$ g/cm$^2$·sec·atm, the water permeability of the substrate is too low, and when it is more than $10^{-1}$ g/cm$^2$ sec atm, the salt rejection tends to be extremely low. Accordingly, preferred membrane constants are $10^{-1}$ to $10^{-6}$ g/cm$^2$·sec·atm, and the best results are obtained with a membrane constant of $10^{-3}$ to $10^{-6}$ g/cm$^2$·sec·atm. The term "membrane constant", as used herein, denotes the amount of pure water which permeates through the membrane under a pressure of 4 kg/cm$^2$, and is expressed in g/cm$^2$·sec·atm.

Inorganic materials such as porous glass, sintered metals and ceramics may be used as the microporous substrate. Advantageously, microporous substrates prepared from organic materials in a manner known per se are used. Examples of the organic materials include "Millipore VF" and "Millipore VM" (products of Millipore Company, U.S.A.); cellulose ester derivatives such as cellulose acetate, cellulose butyrate, cellulose propionate, cellulose acetate butyrate and cellulose triacetate; cellulose ether derivatives such as methyl cellulose, ethyl cellulose and ethylmethyl cellulose; polysulfone derivatives such as polysulfone and sulfonated polysulfone; sulfonated polyphenylene oxide; phenolic resins, sulfonated phenolic resins; polyvinyl compounds such as polyacrylonitrile, halogenated vinyl polymers containing at least 40 mole % of vinylidene fluoride, and halogenated vinyl polymers containing at least 40 mole % of vinyl chloride; polyamides such as nylon 6, nylon 66, poly(meta-phenylene isophthalamide) and poly(para-phenylene terephthalamide); polyamide hydrazides such as the one obtained from metaaminobenzoic hydrazide and terephthaloyl chloride; and polyesters such as polyethylene terephthalate, polybutylene terephthalate or sulfonated polyethylene terephthalate.

Preferred microporous substrates are those prepared from polysulfones, sulfonated polysulfone, cellulose acetate, cellulose triacetate, polyacrylonitrile, a halogenated vinyl polymer containing vinylidene fluoride, and a halogenated vinyl polymer containing vinyl chloride.

Polysulfone microporous film has been found to be a particularly effective support material for the membranes of the invention. A microporous substrate made of cellulose acetate or a halogenated vinyl polymer containing vinylidene fluoride is another very effective support material. Preparation of polysulfone microporous substrate is described in Office of Saline Water Research and Development Progress Report No. 359, October 1968.

Preferably, the substrate is used reinforced at its back with a woven or non-woven cloth, etc. Examples of the woven or non-woven cloth are those of polyethylene terephthalate, polystyrene, polypropylene, nylon, and vinyl chloride resins.

It has been found in accordance with this invention that the performance of the substrate can be increased by pre-heating the polysulfone microporous substrate (preferably of an anisotropic structure), and by further pre-treating it with diluted sulfuric acid with or without heat-treatment, a permselective composite membrane having further improved flux and salt rejection characteristics can be obtained.

The pre-heating of the polysulfone microporous substrate can be performed, for example, in air or an inert gas at a temperature of 60° to 140° C., preferably 80° to 120° C., for 1 to 30 minutes, preferably 3 to 10 minutes. Generally, when the temperature is lower than the specified range and the time is shorter than the specified range, no appreciable effect is produced. When the temperature is higher than the specified range and the time is lower than the specified range, the polysulfone tends to be degenerated by heat. It is desirable therefore to avoid temperature and time conditions outside the specified ranges.

The pre-treatment with diluted sulfuric acid can be performed by immersing the microporous polysulfone substrate in an aqueous solution of sulfuric acid in a concentration of 0.5 to 10% by weight, preferably 1.0 to 5% by weight, and heating it at 60° to 140° C., preferably 80° to 120° C., for 3 to 30 minutes, preferably 5 to 15 minutes.

The coating of the polymer solution on the microporous substrate can be performed by various known methods such as solution casting, brush coating, spraying, wig coating or roll coating, or by immersing the substrate in the polymer solution.

The coating can be formed on one or both surfaces of the substrate depending upon the end use of the membrane to be obtained.

The amount of the coating of the polymer solution can be varied according to the concentration of the polymer in the polymer solution, the thickness of the polymer film required of the resulting membrane, etc. Generally, the amount is advantageously at least 0.05 ml per cm$^2$ of the supporting membrane.

Since the polymer solution usually has a low viscosity, it can be very smoothly coated on the microporous substrate and penetrated into the micropores. If desired, the coating may be heated.

The substrate to which the polymer solution has been applied is then subjected to a known means such as scraping or draining so as to remove the excess of the liquid. Usually, the liquid on the surface of the substrate is scraped off by a doctor blade, a glass rod, etc., and the substrate is caused to stand erect and subjected to a drain treatment. As a result, a very thin uniform liquid film can be formed on the surface of the substrate. The drain treatment can be carried out generally at room temperature for 1 to 30 minutes, preferably 5 to 20 minutes. As a result, a thin film of the polymer solution having a total thickness of about 500 to about 10,000 Å, preferably about 1,000 to about 4,000 Å, is deposited on the surface of the substrate.

The substrate coated with the polymer solution can be dried supported on a rigid plate such as a glass plate or a metal plate. The drying temperature is affected mainly by the thermal stability of the substrate. Relatively low drying temperatures (at room temperature and up to about 80° C.) must be used for substrates having low thermal stability such as cellulose acetate and halogenated vinyl polymers containing vinylidene fluoride. However, in the case of substrates having superior thermal stability, drying can be performed at a relatively high temperature of, say 70° to about 120° C. Accordingly, the coated substrate is dried generally at room temperature to about 250° C., peferably at 70° to 120° C. It is preferred to perform the drying uniformly over the entire surface. For this purpose, dryers adapted to exhaust gases forcibly, such as an air-circulating type oven, are used advantageously. The time required for the drying varies according, for example, to the drying temperature, and the exhausting conditions. Usually it is 3 minutes to 6 hours.

Thus, a composite membrane having supported thereon an ultrathin film of the imidazolone ring-containing aromatic polymer is obtained. In order to achieve the desired permselectivity, it is highly desirable that the ultrathin film should have a thickness of about 100 to about 10,000 Å, preferably about 200 to about 5,000 Å, more preferably about 300 to about 1,000 Å.

If, therefore, an ultrathin film of the specified thickness cannot be obtained by one cycle of coating and drying, this procedure can be repeated two or more times. Usually, when the concentration of the polymer in the polymer solution is low, for example, below 1% by weight, it is desirable to repeat the above procedure two or more times. When the polymer concentration is 2% by weight or more, one cycle of the operation suffices in many cases.

The dried membrane can be washed with water or a weakly acidic aqueous solution after cooling.

The resulting composite membrane as such can be put to actual use as a permselective membrane. According to this invention, its water flux and/or salt rejection characteristics can be enhanced by subjecting the composite membrane to a chelating treatment using a chelating agent. The chelating agent is a compound containing a metal atom having the ability to form a chelate with a secondary amino group, a carboxyl group, and/or a sulfo group. Examples of the chelating agent are $BaCl_2$, $MgCl_2$, $HgCl_2$, $CuCl_2$, $CaCl_2$, $FeCl_3$, $AlCl_3$ and $CoCl_3$. Among these, $FeCl_3$, $BaCl_2$, $CaCl_2$ and $MgCl_2$ are preferred. The chelating treatment can be easily performed by immersing the membrane in an aqueous solution of the metal compound in a concentration of 1 to 30% by weight for about 10 to 60 minutes.

Thus, the process of this invention provides a permselective composite membrane comprising (1) a microporous substrate (preferably having a maximum surface pore size of not more than 5,000 Å and a thickness of about 25 to 1,000 microns), and (2) a permselective ultrathin film of the imidazolone ring-containing aromatic polymer described hereinabove supported (or deposited) on at least one surface of the microporous substrate. In the composite membrane, the thickness of the ultrathin film is preferably between about 100 and 10,000 Å.

The membrane having permselectivity provided by the process of this invention is very suitable as a permselective membrane for the applications to be described because it has superior salt rejection and flux properties, especially flux properties, superior flexibility, high resistance to compaction and high resistance to chemical and biological degradation, especially oxidation resistance, hydrolysis resistance and dry-wet cycle resistance.

The membrane can be advantageously used as a permselective membrane to separate and remove tiny amounts of contaminated molecules dispersed or dissolved in a liquid or gas, and can find extensive application in, for example, the desalting of sea water and brackish water, and the treatment of industrial effluents containing organic matter, liquors containing a mixture of organic substances, and waste waters from the food industry.

The membrane can be used especially advantageously as a reverse osmosis membrane in the method for desalination of saline or brackish water by reverse osmosis which comprises contacting the saline or brackish water under pressure with the reverse osmosis membrane. This method is known, and a specific procedure described, for example, in Ind. Eng. Chem. Foundam. 3, 206 (1964) can be used.

The following examples illustrate the present invention in more detail.

REFERENTIAL EXAMPLE 1

Preparation of polybenzimidazolone:

Reaction (1-A)

In a 300 ml three-necked flask equipped with a nitrogen introducing tube, a cooler and a stirrer, 10.0 g (0.05 mole) of 4,4'-diaminodiphenyl ether and 10.6 g (0.1 mole) of sodium carbonate were dissolved in 120 ml of dimethyl sulfoxide. The sodium carbonate remained insoluble in the solution. With stirring, 18.85 g (0.05 mole) of 3,3'-dinitro-4,4'-dichlorodiphenylsulfone was poured into the solution. The solution became reddish brown. The temperature was raised to 120° C., and the reaction was continued for 20 hours. A reddish brown viscous solution was obtained.

The solution was poured into water, and the precipitate was thoroughly washed and dried to afford a reddish orange powder. This polymer had an inherent viscosity ($\rho_{inh}$) of 1.00, and was soluble in amide-type solvents such as N-methyl pyrrolidone, N,N-dimethyl acetamide, or dimethyl formamide, dimethyl sulfoxide, tetramethylene sulfone, nitrobenzene, tetramethyleneurea, and pyridine.

A film prepared from an N-methyl pyrrolidone solution of the polymer was tough, and its infrared absorption spectrum showed an absorption ascribable to the imine at 3350 cm$^{-1}$, and an absorption ascribable to the nitro group at 1560 cm$^{-1}$.

The elemental analysis values for this polymer were as follows: Found: C 56.14%, H 3.0%, N 10.95%, S 6.72%. Calculated: C 57.13%, H 3.17%, N 11.11%, S 6.35%.

From the results of the infrared absorption spectrum and the elemental analysis values, the polymer was found to be polyimine having the following recurring unit

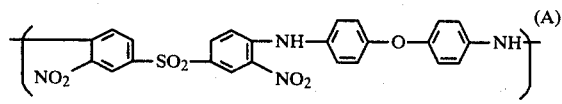

10.0 g of the reddish brown flaky polymer (A) obtained by the method of Referential Example 1 was poured into a mixture of 300 ml of methanol and 500 ml of water. With stirring, the temperature was maintained at 75° to 80° C., and 150 g of anhydrous sodium hydrosulfite was poured into the mixture over the course of about 30 minutes. The mixture was stirred for another 2 hours at this temperature. The flaky polymer present in the heterogeneous state in the solution gradually turned from reddish brown to white yellow.

After this reducing procedure, the polymer was washed thoroughly with a large quantity of water, and dried at room temperature under reduced pressure.

The resulting white yellow polymer was soluble in amide-type solvents, dimethyl sulfoxide and a mixture of water and acetone. The inherent viscosity of the polymer was 0.81.

The elemental analysis values of the resulting polymer were as follows: Found: C 63.23%, H 4.05%, N 12.85%, S 6.74%

The calculated values for polyamino imine resulting from the reduction of the nitro group of the original polymer were as follows:

Calculated: C 64.86%, H 4.50%, N 12.61%, S 7.21% These calculated values substantially corresponded with the values as found.

A thin film prepared from an N,N-dimethyl acetamide solution of this polymer was analyzed by infrared absorption spectroscopy. It was found that an absorption considered to be ascribable to the nitro group bonded to the aromatic nucleus in the vicinity of 1560 cm$^{-1}$ disappeared completely, and absorption ascribable to the amino group were observed in the vicinity of 3350 cm$^{-1}$ and 3450 cm$^{-1}$.

From the results of the elemental analysis values and the infrared absorption spectrum, the polymer was identified as polyaminoimine having the following recurring unit

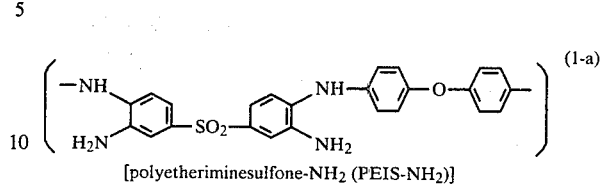

[polyetheriminesulfone-NH$_2$ (PEIS-NH$_2$)]

Reaction (1-B)

In a three-necked flask equipped with a stirer, a nitrogen-introducing tube and a calcium chloride tube, 4.42 g of the polymer (1-a) was dissolved in 50 ml of N-methyl pyrrolidone. To the solution was added 0.95 g of sodium carbonate, and with vigorous stirring, 2.19 g of ethyl chlorocarbonate was added portionwise. The solution was stirred for about 1 hour at room temperature, and heated over an oil bath at 160° C. for 3 hours. After the reaction, the reaction mixture was poured into a large excess of water, filtered, and dried to afford a light yellow polymer. The polymer had an inherent viscosity of 0.85. The polymer had the following elemental analysis values.

Found: C 60.17%, H 3.85%, N 10.25%, S 6.35% Calculated: C 62.89%, H 3.25%, N 11.29%, S 6.46%

The resulting polymer was soluble in aprotic polar solvents such as N,N'-dimethyl formamide, N,N-dimethyl acetamide, dimethyl sulfoxide or N-methyl pyrrolidone.

The infrared absorption spectrum of a film prepared by casting from its N-methyl pyrrolidone solution showed an absorption inherent to a benzimidazolone group in the vicinity of 1730 cm$^{-1}$, 1620 cm$^{-1}$, 1505 cm$^{-1}$ and 1190 cm$^{-1}$.

In the NMR spectrum of this polymer in dimethyl sulfoxide-d$_6$, an absorption ascribable to the ethyl group of the urethane group and an absorption of unreacted —NH$_2$ were not observed. From this fact, this polymer was identified as a polymer having a benzimidazolone group expressed by the following formula

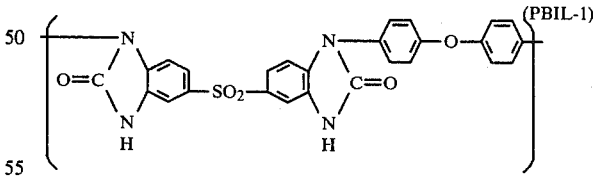

REFERENTIAL EXAMPLES 2 TO 10

(2-A)

Prepolymers for polybenzimidazolones indicated in Table 1 were prepared by repeating the procedure of Reaction (1-A) of Referential Example 1 except that each of the diamines indicated in Table 1 was used instead of the 4,4'-diaminodiphenyl ether and each of the halonitro compound indicated in Table 1 was used instead of the 4,4'-dichloro-3,3'-dinitrodiphenyl sulfone.

TABLE 1

| No. | Diamine (moles) | Halonitro compound (moles) | Structure of prepolymer |
|---|---|---|---|
| 2-a | H₂N—⟨⟩—CH₂—⟨⟩—NH₂ (0.1) <br><br> NH₂—⟨⟩—NH₂ (0.05) | DDDS (0.1) | ⟮—N(H)—⟨⟩(NH₂)—SO₂—⟨⟩(NH₂)—N(H)—⟨⟩—CH₂—⟨⟩—⟯ <br><br> ⟮—N(H)—⟨⟩(H₂N)—SO₂—⟨⟩(NH₂)—N(H)—⟨⟩—⟯₀.₅ |
| 3-a | H₂N—⟨⟩—CH₂—⟨⟩—NH₂ (0.05) <br><br> H₂N—⟨⟩(CH₃)—NH₂ (0.01) | " | ⟮—N(H)—⟨⟩(H₂N)—SO₂—⟨⟩(NH₂)—N(H)—⟨⟩—CH₂—⟨⟩—⟯₀.₅ <br><br> ⟮—N(H)—⟨⟩(H₂N)—SO₂—⟨⟩(NH₂)—N(H)—⟨⟩(H₃C)—⟯₀.₁ |
| 4-a | H₂N—⟨⟩—CH₂—⟨⟩—NH₂ (0.09) <br><br> H₂N—⟨⟩(COOH)—NH₂ (0.03) | " | ⟮—N(H)—⟨⟩(H₂N)—SO₂—⟨⟩(NH₂)—N(H)—⟨⟩—CH₂—⟨⟩—⟯₀.₉ <br><br> ⟮—N(H)—⟨⟩(H₂N)—SO₂—⟨⟩(NH₂)—N(H)—⟨⟩(COOH)—⟯₀.₃ |
| 5-a | H₂N—⟨⟩—O—⟨⟩—NH₂ (0.07) <br><br> H₂N—⟨⟩—CH₂—⟨⟩—NH₂ (0.08) | " | ⟮—N(H)—⟨⟩(H₂N)—SO₂—⟨⟩(NH₂)—N(H)—⟨⟩—O—⟨⟩—⟯₀.₇ <br><br> ⟮—N(H)—⟨⟩(H₂N)—SO₂—⟨⟩(NH₂)—N(H)—⟨⟩—CH₂—⟨⟩—⟯₀.₈ |
| 6-a | HOOC—⟨⟩(H₂N)—CH₂—⟨⟩(NH₂)—COOH (0.02) <br><br> H₂N—⟨⟩(HO₃S)—⟨⟩(SO₃H)—NH₂ (0.02) | " | ⟮—N(H)—⟨⟩(H₂N)—SO₂—⟨⟩(NH₂)—N(H)—⟨⟩(HOOC)—CH₂—⟨⟩(COOH)—⟯₀.₂ <br><br> ⟮—N(H)—⟨⟩(H₂N)—SO₂—⟨⟩(NH₂)—N(H)—⟨⟩(SO₃H)—⟨⟩(SO₃H)—⟯₀.₂ |
| 7-a | H₂N—⟨⟩—O—⟨⟩—NH₂ (0.08) | " | ⟮—N(H)—⟨⟩(H₂N)—SO₂—⟨⟩(NH₂)—N(H)—⟨⟩—O—⟨⟩—⟯₀.₈ |

TABLE 1-continued

| No. | Diamine (moles) | Halonitro compound (moles) | Structure of prepolymer |
|---|---|---|---|
|  | 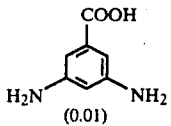 (0.01) |  | 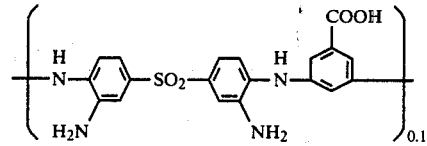 |
| 8-a | 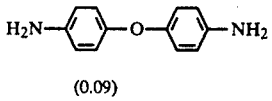 (0.09) | " | 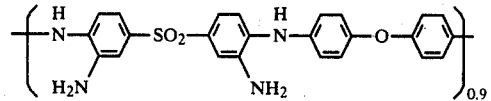 |
|  | 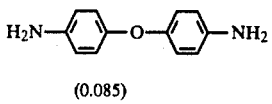 (0.085) |  | 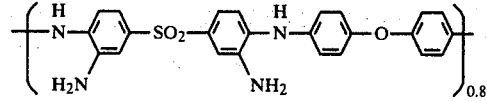 |
| 9-a | 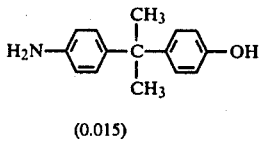 (0.015) | " | 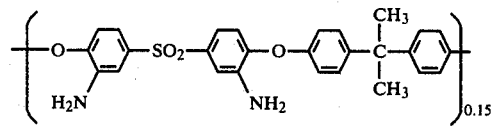 |
|  |  | 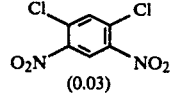 (0.03) | 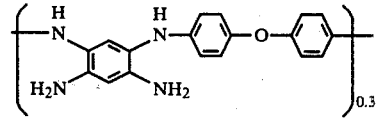 |
| 10-a | 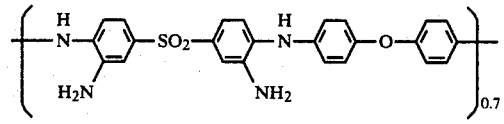 (0.1) | DDDS (0.07) | 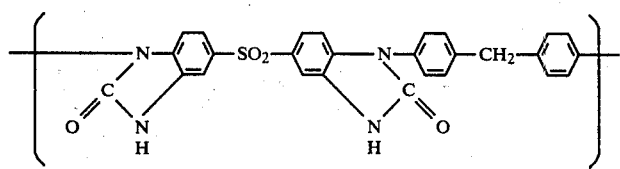 |

(2-B)

Polybenzimidazolones were prepared by repeating the procedure of Reaction (1-B) of Referential Example 1 except that each of the prepolymers obtained in (2-A) above was used instead of PEIS-NH$_2$, and each of the cyclizing agents indicated in Table 2 was used instead of the phenyl chlorocarbonate. The numbers attached to the prepolymers in Table 2 correspond to the numbers used in Table 1.

TABLE 2

| No. | Pre-polymer | Cyclizing agent | Polybenzimidazolone (PBIL for short) | Inherent viscosity(*) |
|---|---|---|---|---|
| 2-b | 2-a | Phenyl chloro-carbonate | 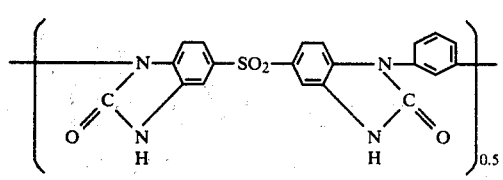 (PBIL-2) | 0.72 |
| 3-b | 3-a | Ethyl chloro-formate |  | 0.51 |

TABLE 2-continued

| No. | Pre-polymer | Cyclizing agent | Polybenzimidazolone (PBIL for short) | Inherent viscosity(*) |
|---|---|---|---|---|
| | | | (PBIL-3) | |
| 4-b | 4-a | Ethyl chloroformate | (PBIL-4) | 0.82 |
| 5-b | 5-a | Ethyl chloroformate | (PBIL-5) | 0.48 |
| 6-b | 6-a | Ethyl chloroformate | (PBIL-6) | 0.39 |

TABLE 2-continued
| No. | Pre-polymer | Cyclizing agent | Polybenzimidazolone (PBIL for short) | Inherent viscosity(*) |
|---|---|---|---|---|
| 7-b | 7-a | Ethyl chloroformate | (PBIL-7) 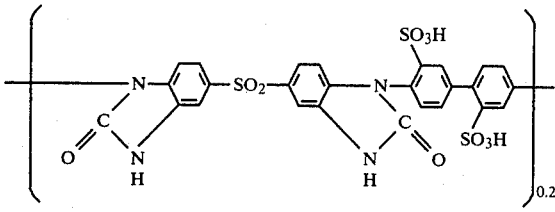 | 0.51 |
| 8-b | 8-a | Phenyl chloroformate | (PBIL-8) 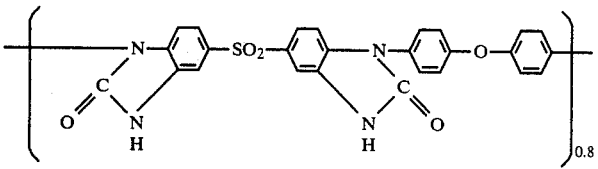 | 0.88 |
| 9-b | 9-a | Phenyl chloroformate | (PBIL-9) 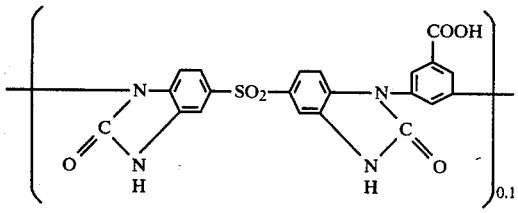 | 0.35 |
| 10-b | 10-a | Phenyl chloroformate | 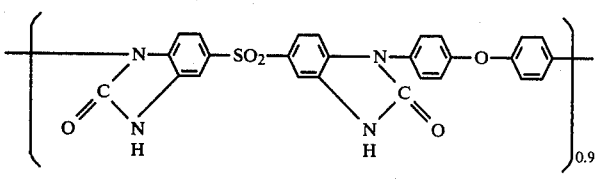 | 0.98 |

TABLE 2-continued

| No. | Pre-polymer | Cyclizing agent | Polybenzimidazolone (PBIL for short) | Inherent viscosity(*) |
|---|---|---|---|---|

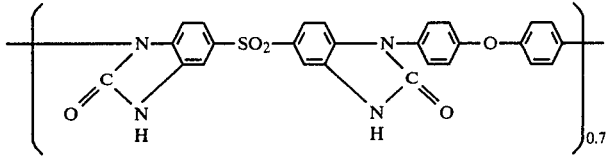

(PBIL-10)

(*)Inherent viscosity measured at 30° C. in N-methyl pyrrolidone at c = 0.5 g/100 ml.

REFERENTIAL EXAMPLE 11

4.0 g of prepolymer (3-a) was dissolved in 40 g of N-methylpyrrolidone. Sodium carbonate (2.12 g) was added, and under cooling, 2.20 g of ethyl chloroformate was added. The mixture was stirred for 1 hour. The mixture was further stirred at room temperature for 1 hour, and added to a large quantity of water. The polymer precipitated was recovered. In the 100 MHz NMR spectrum (in dimethyl sulfoxide-d$_6$ at room temperature), an absorption of a triplet methyl proton was observed at 1.2 ppm, an absorption based on $$\overset{H}{\underset{}{-N-}}$$

of the main chain at 8.0 ppm (singlet), and an absorption based on the urethane group (—NHCOO—) at 8.9 ppm. The absorption based on —NH$_2$ observed in (4-a) (about 5.2 ppm, broad singlet) was no longer seen. It was confirmed therefore that the resulting polymer had a basic skeleton of 4-a containing an ethyl urethane group at the side chain.

4.0 g of this polymer was re-dissolved in 40 ml of N-methylpyrrolidone, and heated at 160° C. for about 30 minutes in a stream of nitrogen. The reaction mixture was allowed to cool to room temperature, and added to a large quantity of water. The polymer precipitated was recovered.

In the NMR spectrum of the polymer, the intensities of absorptions of —CH$_3$ and $$\overset{H}{\underset{}{-N-COO}}$$

due to the urethane group decreased, and the intensity ratio of the absorption of the remaining methyl groups and the absorption of the entire phenyl protons was about 0.4, which well agreed with a calculated value of 0.02 for the case when 50% of the polymer was cyclized. Accordingly, the resulting polymer was identified as a PBIL-3 type polymer (PBIL-11) having about 50% of an ethyl-urethane group as a pendant group which was expressed by the following structural formula

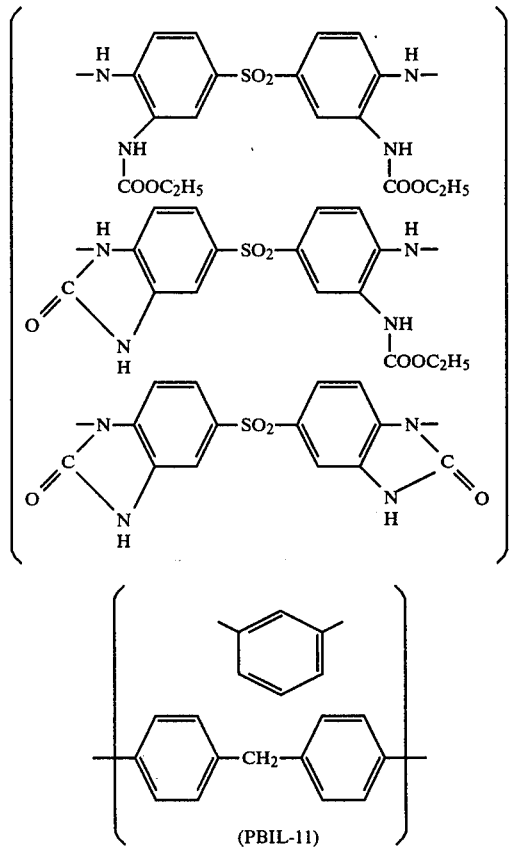

(PBIL-11)

REFERENTIAL EXAMPLES 12 TO 16

Polybenzimidazolone were prepared by repeating the procedure of Reaction (1-B) of Referential Example 1 except that each of the reagents indicated in Table 3 was used instead of the phenyl chloroformate. The amount of the reagent charged was 1 mole per equivalent of the amino groups of prepolymer (1-a). The structure of the resulting polymers are also shown in Table 3.

TABLE 3
| No. | Prepolymer | Reagent (moles) | PBIL |
|---|---|---|---|
| 12 | 1-a | Phenyl chlorocarbonate (0.9)* <br><br> Benzoyl chloride (0.1) | 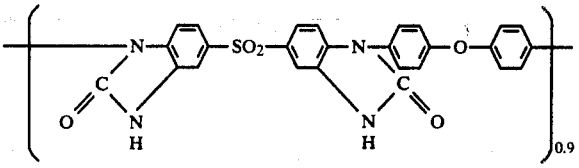 <br> I.V = 0.81 (PBIL-12) |
| 13 | 1-a | Ethyl chlorocarbonate (0.9) <br><br> Methanesulfonyl chloride (0.1) | 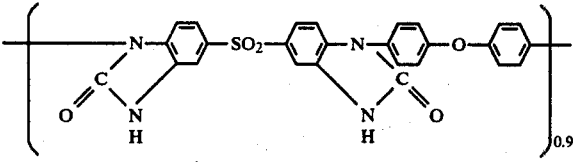 <br> I.V = 0.72 (PBIL-13) |
| 14 | 1-a | Phenyl chlorocarbonate (0.9) <br><br> p-Toluenesulfonyl chloride (0.1) | 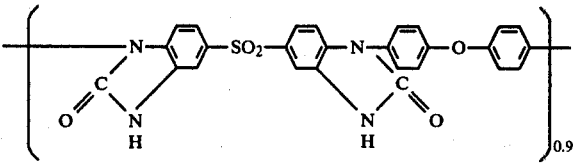 <br> I.V = 0.82 (PBIL-14) |
| 15 | 1-a | Phenyl chlorocarbonate (0.9)* <br><br> Acetyl chloride (0.1) | 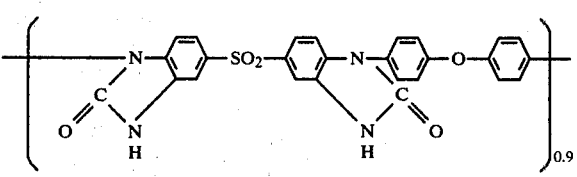 <br> I.V = 0.91 (PBIL-15) |

TABLE 3-continued

| No. | Prepolymer | Reagent (moles) | PBIL |
|---|---|---|---|
| 16 | 1-a | Phenyl chloroformate (0.8)* | |
| | | Phenyl isocyanate (0.2) | |
| | | | I.V = 0.77 (PBIL-16) |

(*)Reaction conditions: 160° C., 1.5 hours

REFERENTIAL EXAMPLE 17

150 parts of dichloroethane containing 10% by weight of chlorosulfonic acid was vigorously stirred under ice cooling. To the solution was added 10.83 parts of very finely pulverized polymer (PBIL-1) little by little. Upon the addition, the polymer turned from pale yellow to black. The solution was stirred for about 2 hours on an ice bath, and then 1,2-dichloroethane was removed by decantation. The residue was washed with 200 parts of fresh 1,2-dichloroethane, and decanted. The residue was washed two times with 200 parts of methanol, and then dissolved in 100 parts of N-methylpyrrolidone. A small amount of the insoluble portion was separated by filtration, and the residue was added to a large quantity of water. The polymer precipitated was recovered. The polymer was found to have an inherent viscosity of 0.98. The polymer had an ion exchange equivalent of 0.697 milliequivalent/g, and was determined to correspond to polybenzimidazolone with a sulfonic acid substituent content of 0.366. The elemental analysis values of this polymer were C: 60.21%, H: 3.27%, N: 7.85%, S: 8.29% which well agreed with the calculated values for the case of the substituent conent of 0.37, i.e. C: 59.35%, H: 3.07%, N: 7.99%, S: 8.35%. The polymer had an inherent viscosity of 0.98, and was determined to have the following structure.

solution was stirred for 4 hours under ice cooling, and the suspended polymer was collected by glass filter. It was washed with methylene chloride and then with methanol, and dissolved in 90 parts of N-methylpyrrolidone. The solution was added to a large excess of water to form a precipitate of the polymer. The polymer had an inherent viscosity of 0.63 and an ion exchange equivalent of 0.579 milliequivalent/g. From this value, the polymer was identified as polybenzimidazolone having a sulfonic acid substituent content of 0.3. The structure of the polymer was as follows:

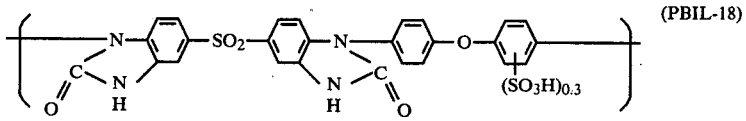
(PBIL-18)

PREPARATION OF A FABRIC-REINFORCED MICROPOROUS SUBSTRATE

A Dacron non-woven fabric (basis weight 180 g/m$^2$) was fixed on a glass plate. Then, a solution containing 20.0% by weight of polysulfone, 15.0% by weight of methyl Cellosolve and the remainder being dimethyl formamide was cast onto the fabric in a layer having a thickness of about 0.2 to 0.3 micron. Immediately, the polysulfone layer was gelled in a room temperature water bath to form a non-woven fabric-reinforced microporous polysulfone membrane.

The resulting microporous polysulfone layer had a thickness of about 40 to 140 microns and was anisotropic in structure.

The resulting microporous substrate had a pure water

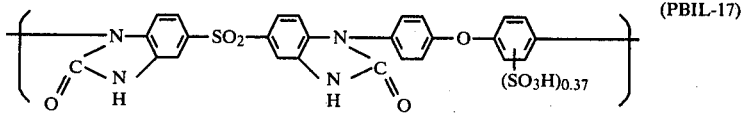
(PBIL-17)

EXAMPLE 18

100 Parts of PBIL-1 was suspended in 150 parts of methylene chloride. With vigorous stirring under ice cooling, 150 parts of dichloroethane containing 10% by weight of chlorosulfonic acid was added dropwise. The flux (membrane constant) of about 3.6 to 5.7×10$^{-3}$ g/cm$^2$·sec·atm. (referred to hereinafter as PS-1).

Likewise, a solution containing 12.5% by weight of polysulfone, 12.5% by weight of methyl Cellosolve and the remainder being dimethyl formamide was cast onto the fabric in a layer having a thickness of about 0.2 micron. The coated fabric was treated in the same way to form a microporous polysulfone layer having a thickness of about 40 to 70 microns and an anisotropic structure. The membrane constant of the substrate was about 3.0 to 7.0×10$^{-2}$ g/cm$^2$·sec·atm. (to be referred to hereinafter as PS-2).

PREPARATION OF A MODIFIED POLYSULFONE SUPPORTING MEMBRANE (A) Polysulfone supporting membrane 3

The polysulfone supporting membrane (PS-1), cut to a square shape with each side measuring about 10 cm, was placed on a well-polished glass plate or metal plate so that its backing contacted the plate. Then, each side of the membrane was fixed by an adhesive tape. A 2% by weight aqueous solution of sulfuric acid was poured onto the fixed supporting membrane, and cast in one direction by using a glass rod. The aqueous sulfuric acid solution on the surface was scraped off, and the glass plate or metal plate was caused to stand perpendicular. After leasing it as it was for 5 minutes to drain the remaining aqueous sulfuric acid solution, the coated glass or metal plate was heated in an oven (through which air was passing at a speed of 3.5 m/sec.) for 10 minutes at the same temperature as that used in preparing the PBIL composite membrane. The resulting membrane will be referred to herein as PS-3. This polysulfone membrane had a thickness of 30 to 130 microns, and a membrane constant of 1.20 to 1.75×10$^{-4}$ g/cm$^2$·sec·atm.

(B) Polysulfone supporting membrane 4

In a manner similar to the preparation of PS-3, the PS-2 membrane was heat-treated at a predetermined temperature for a predetermined period of time without using an aqueous solution of sulfuric acid. The resulting membrane will be referred to hereinbelow as PS-4. The polysulfone membrane generally had a membrane constant of 2×10$^{-4}$ to 10$^{-6}$ g/cm$^2$·sec·atm· although varying according to the treating temperature.

REVERSE OSMOSIS TREATING METHOD

Reverse osmosis was carried out in an ordinary continuous pump-type reverse osmosis device using a 5000 ppm aqueous solution of sodium chloride (42.0 kg/cm$^2$·G) or a 10,000 ppm aqueous solution of sodium chloride (40.0 kg/cm$^2$·G) at a pH of 7.0 and a temperature of 25° C. The first-mentioned solution and pressure were used in Examples 17 to 38, and the latter-mentioned solution and pressure, in Examples 2 to 16.

EXAMPLE 1

A room temperature film-forming dope consisting of 50 parts of water, 45 parts of ethylenediamine, 5 parts of dimethyl formamide and 0.1 part of PBIL-2 was cast on the polysulfone-coated layer of PS-2. The dope on the surface was scraped off by a glass rod, and the coated membrane was maintained perpendicular for about 5 minutes to drain the excess of the dope. The coated supporting membrane was heated for 6 minutes in an air-blowing type oven maintained at 106° C. and at an air speed of 3.5 m/sec.

The supporting membrane was then withdrawn from the oven, and again the aforesaid dope was cast on it. The coated membrane was similarly heated.

The supporting membrane thus treated twice was taken out of the oven, and allowed to cool. The resulting composite membrane was peeled off from the glass plate, and immersed for about 30 minutes in water at room temperature.

The composite membrane produced was subjected to the reverse osmosis test described above. At the initial stage, the composite membrane had a water flux of 39.8 liters/m$^2$·hr· and a salt rejection of 96.5%. The reverse osmosis test was carried out at a pressure of 42.0 kg/cm$^2$·G using a 0.5% by weight aqueous solution of sodium chloride.

EXAMPLES 2 to 35

Film-forming dopes shown in Table 4 were prepared from the various polybenzimidazolones prepared in the Referential Examples, and cast on the polysulfone substrates shown in Table 4 to form composite membranes in the same way as in Example 1. The heating conditions in the oven and the number of coating operations were changed as shown in Table 4. The resulting composite membranes were subjected to the reverse osmosis test and the results are shown in Table 4.

In Table 4, DMAc stands for N,N-dimethyl acetamide; DMF, for N,N-dimethyl formamide. The unit of the water flux was liters/m$^2$·hr., and the unit of the salt rejection was %. The numbers in the column of "Film-forming dope" represent the weight parts of the compounds used. The initial properties determined by the reverse osmosis test were those obtained after operating for one hour.

TABLE 4

| Example | Polysulfone membrane | Film-forming dope | | | | Heating Conditions | | Number of coating operation | Initial properties by reverse osmosis test | | Remarks |
|---|---|---|---|---|---|---|---|---|---|---|---|
| | | PBIL | Water | Amine | Aprotic solvent | Temperature (°C.) | Time (min.) | | Water flux | Salt rejection | |
| 2 | PS-1 | PBIL-1 2.5 | 42 | Ethylamine 56 | DMAc 2 | 120 | 10 | 1 | 16.1 | 98.6 | |
| 3 | PS-1 | " | 45 | Ethylenediamine 50 | DMF 5 | 120 | 10 | 1 | 13.1 | 90.1 | |
| 4 | PS-1 | " | 50 | Ethylenediamine 50 | none | 120 | 10 | 1 | 25.0 | 88.4 | ** |
| 5 | PS-4** | " | 45 | Ethylenediamine 50 | DMF 5 | 120 | 10 | 2 | 10.3 | 95.5 | Preheated 120° C. x 7 min. |
| 6 | PS-1 | " | 45 | Ethylenediamine 50 | " | 110 | 10 | 1 | 25.0 | 91.7 | |
| 7 | PS-2 | " | 36 | Ethylamine | DMAc | 115 | 10 | 1 | 14.4 | 71.2 | |

TABLE 4-continued

| Example | Polysulfone membrane | Film-forming dope PBIL | Film-forming dope Water | Film-forming dope Amine | Film-forming dope Aprotic solvent | Heating Conditions Temperature (°C.) | Heating Conditions Time (min.) | Number of coating operation | Initial properties by reverse osmosis test Water flux | Initial properties by reverse osmosis test Salt rejection | Remarks |
|---|---|---|---|---|---|---|---|---|---|---|---|
| 8 | PS-2 | " | 42 | Ethylamine 49 | DMAc 3 | 120 | 10 | 1 | 24.4 | 91.2 | |
| 9 | PS-2 | " | 30 | Ethylamine 70 | none | Room temperature | 60 | 1 | 35 | 85.7 | |
| 10 | PS-4** | PBIL-1 2.5 | 45 | Ethylenediamine 50 | DNF 5 | 120 | 10 | 1 | 15.5 | 88.4 | ** Preheated 120° C. × 5 min. |
| 11 | PS-4** | PBIL-1 1.0 | 45 | Ethylenediamene 50 | " | 86 | 5 | 2 | 16.3 | 93.9 | ** Preheated 85° C. × 5 min. |
| 12 | PS-4** | PBIL-1 1.5 | 47 | Ethylenediamine 50 | DMF 3 | 86 | 5 | 2 | 14.8 | 90.0 | " |
| 13 | PS-4** | PBIL-1 0.5 | 45 | Ethylenediamine 50 | DMF 5 | 74 | 5 | 2 | 32.9 | 81.0 | ** Preheated 74° C. × 5 min. |
| 14 | PS-2 | PBIL-1 1.5 | 45 | Ethylenediamine 50 | DMF 3 | 85 | 5 | 1 | 16.1 | 91.1 | |
| 15 | PS-4** | PBIL-1 1.25 | 45 | Ethylenediamine 50 | DMF 5 | 120 | 5 | 1 | 23.4 | 92.3 | ** Preheated 120° C. × 5 min. |
| 16 | PS-4** | PBIL-1 1.25 | 47.5 | Ethylenediamine 50 | DMF 2.5 | 86 | 5 | 1 | 17.3 | 86.8 | ** Preheated 86° C. × 5 min. |
| 17 | PS-3 | PBIL-17 0.1 | 45 | Ethylenediamine 50 | DMF 5 | 104 | 6 | 2 | 53.9 | 94.2 | |
| 18 | PS-3 | PBIL-1 0.1 | 45 | Ethylenediamine 50 | " | 102 | 6 | 2 | 44.8 | 93.4 | |
| 19 | PS-1** | PBIL-1 0.5 | 45 | Ethylenediamine 50 | " | 74 | 5 | 2 | 32.9 | 81.0 | ** Preheated 74° C. × 5 min. |
| 20 | PS-3 | PBIL-4 0.1 | 50 | Ethylenediamine 45 | DMF 5 | 110 | 6 | 2 | 35.0 | 94.7 | |
| 21 | " | PBIL-3 0.1 | 50 | Ethylenediamine 45 | " | 104 | 6 | 2 | 63.1 | 90.2 | |
| 22 | " | PBIL-6 0.1 | 50 | Ethylenediamine 45 | " | 110 | 6 | 2 | 62.1 | 90.7 | |
| 23 | " | PBIL-8 0.1 | 50 | Ethylenediamine 45 | " | 110 | 6 | 2 | 60.9 | 94.6 | |
| 24 | " | PBIL-7 0.1 | 50 | Ethylenediamine 45 | " | 104 | 6 | 2 | 34.4 | 84.3 | |
| 25 | " | PBIL-18 0.1 | 50 | Ethylenediamine 45 | " | 104 | 8 | 2 | 37.2 | 89.8 | |
| 26 | PS-1 | PBIL-9 0.25 | 50 | Ethylenediamine 45 | DMF 5 | 110 | 10 | 1 | 12.0 | 81.3 | |
| 27 | " | PBIL-14 0.1 | 50 | Ethylenediamine 50 | none | 110 | 10 | 1 | 27.3 | 83.6 | |
| 28 | " | PBIL-1 0.15 | 30 | Ethylamine 70 | none | 110 | 10 | 1 | 35.0 | 85.7 | |
| 29 | " | PBIL-1 0.25 | 42 | Ethylamine 49 | DMAc 9 | 110 | 10 | 1 | 24.4 | 91.2 | |
| 30 | PS-3 | PBIL-12 0.1 | 50 | Ethylenediamine 45 | DMF 5 | 104 | 10 | 2 | 55.2 | 88.2 | |
| 31 | " | PBIL-15 0.1 | 50 | Ethylenediamine 45 | " | 104 | 10 | 2 | 22.5 | 83.3 | |
| 32 | " | PBIL-11 0.1 | 50 | Ethylenediamine 45 | " | 104 | 6 | 2 | 31.4 | 86.2 | |
| 33 | " | PBIL-16 0.1 | 50 | Ethylenediamine 45 | " | 110 | 10 | 2 | 25.9 | 83.4 | |
| 34 | PS-3 | PBIL-10 | 50 | Ethylenediamine | DMF 5 | 110 | 10 | 2 | 23.2 | 90.8 | |

TABLE 4-continued

| Example | Polysulfone membrane | Film-forming dope | | | | Heating Conditions | | Number of coating operation | Initial properties by reverse osmosis test | | Remarks |
|---|---|---|---|---|---|---|---|---|---|---|---|
| | | PBIL | Water | Amine | Aprotic solvent | Temperature (°C.) | Time (min.) | | Water flux | Salt rejection | |
| 35 | " | 0.1 PBIL-13 0.1 | 50 | 45 Ethylenediamine 45 | " | 110 | 10 | 2 | 20.6 | 87.5 | |

EXAMPLE 36

The PS-3 membrane was peeled off from the glass plate, and immersed for 3 minutes in a film-forming dope consisting of 0.1 part of PBIL-1, 50 parts of ethylenediamine, 45 parts of water and 5 parts of DMF. The membrane was taken out of the dope, and suspended in the air in the perpendicular direction. It was maintained in this condition for 5 minutes to drain the excess of the dope, and then heated in an oven at 80° C. for 10 minutes while being held suspended in the perpendicular direction. After the heating, the membrane was allowed to cool to room temperature, and the operations subsequent to the immersion were repeated. After cooling, the membrane was directly subjected to the reverse osmosis test without washing with water. The membrane was found to have a water flux of 26.1 liters/m$^2$·hr· and a salt rejection of 90.6%.

EXAMPLE 37

A composite membrane was performed in the same way as in Example 36 except that a solution consisting of 0.05 part of PBIL-2, 50 parts of ethylenediamine, 45 parts of water and 5 parts of dimethyl formamide was used as the film-forming dope. As a result of the reverse osmosis test, the composite membrane was found to have a water rejection of 19.8 liters/m$^2$·hr·, and a salt rejection of 85.0%.

EXAMPLE 38

The membrane obtained in Example 1 was continuously subjected to the reverse osmosis test. During the first 17 hours, the water flux of the membrane decreased and its salt rejection increased with time. After a lapse of 17 hours, the water flux remained at 33 liters/m$^2$·hr· and the salt rejection, at 97.5%. These properties scarcely changed during the subsequent continuous operation for 130 hours. Accordingly, the coefficient of compaction during an operation period of 130 hours was calculated as −0.001, and the membrane exhibited very good resistance to compaction.

When the anisotropic membrane obtained in Comparative Example 1 was subjected to the reverse osmosis test under the same conditions as above, the water flux gradually decreased, and the coefficient of compaction of the membrane was about −0.04.

EXAMPLE 39

The membrane of Example 28 which had been just subjected to the reverse osmosis test was completely dehydrated, and allowed to stand for 24 hours in air, and again subjected to the reverse osmosis test at 42 kg/cm$^2$·G using a 0.5% by weight aqueous solution of sodium chloride. It exhibited a water flux of 31.8 liters/m$^2$·hr· and a salt rejection of 97.5% which were much the same as the properties of the membrane before the test.

On the other hand, when the membrane obtained in Comparative Example was allowed to stand for 24 hours in the air under the same conditions, the anisotropic membrane lost its flexibility, and could not be subjected to the reverse osmosis test.

COMPARATIVE EXAMPLE 1

A solution consisting of 15 parts of PBIL-1, 4.5 parts of lithium chloride and 85 parts of N-methylpyrrolidone was prepared, and cast on a glass plate by a doctor blade with a clearance of 300 microns. The coated plate was heated at 110° C. (at an air speed of 3.5 m/sec.) for 8 minutes, and immediately then immersed in water to form an anisotropic membrane of PBIL-1. The membrane was subjected to the reverse osmosis test at an operating pressure of 40 kg/cm$^2$·G using a 1.0% by weight aqueous solution of sodium chloride. It was found to have a water flux of 25.2 liters/m$^2$·hr. and a salt rejection of 98.1%. When the membrane was continuously subjected to the reverse osmosis test for long periods of time, its water flux and salt rejection constantly changed during the operating period. After a lapse of 130 hours, the water flux reached 21.2 liters/m$^2$·hr. and the salt rejection became 98.6%. Accordingly, the coefficient of composition was about −0.04.

COMPARATIVE EXAMPLE 2

1.0 g of PBIL-1 was dissolved in 9.0 g of N-methylpyrrolidone at 60° C. to form a film-forming dope. The dope was cast on a well-polished glass plate using a doctor blade with a clearance of 120 microns, and dried at 130° C. for 30 minutes and at 150° C. for 1 hour. Then, the film was peeled off from the glass plate in water.

A part (larger than a membrane area required for a reverse osmosis test to be described hereinbelow) of the resulting film was placed in a pressurizable vessel together with a filter paper and a perforated plate to set them in the order of the film, the filter paper, and the perforated plate. A 0.05% by weight aqueous solution of crystal violet having a molecular weight of 570 and assuming a deep blue color was poured into the space on the film side, and the vessel was placed under a pressure of 1.5 kg/cm$^2$ for about 5 minutes. Then, the pressure was returned to normal atmospheric pressure, and the deep blue aqueous solution was removed from the vessel. The dye adhering to the surface of the film was washed with water, and the film and the filter paper were withdrawn from the vessel. The absence of pinholes in the film was ascertained from the observation that there was no spot of deep blue on the filter paper.

The resulting film having a thickness of 5.3 microns was mounted in a reverse osmosis test cell, and tested for its performance. The reverse osmosis test was conducted by using an experimental cell with an effective membrane area of 11 m$^2$, and mounting the film, a porous base material (Millipore Filter VMWP 04700, a product of Millipore Company) and sintered metal (with a pore size of 3 microns) in this order in the cell. The operating conditions were: a 1.0% aqueous solution of sodium chloride; a pressure of 40 kg/cm².G; a temperature of 30° C.; the rate of circulation of water being 100 l/hour. It was found that the water flux was 1.4 l/m².hr. The salt rejection was 99.86%.

What we claim is:

1. A process for producing a permselective composite membrane, which comprises
    (1) dissolving an imidazolone ring-containing aromatic polymer in an aqueous liquid medium containing a water-miscible amine having a pka of more than 5.0 in a concentration of at least 5% by weight to form a solution containing the polymer in a concentration of 0.01 to 20.0% by weight, said polymer comprising at least 30 mole %, based on the entire recurring units, of at least one recurring unit of the following formula

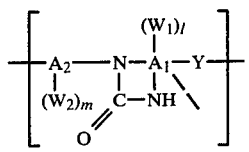

(I)

wherein $A_1$ represents an aromatic group having a valence of (3+l), the dashed line represents the presence or absence of a bond, and the two nitrogen atoms and $W_1$ are all bonded to the nuclear carbon atoms of the aromatic group $A_1$; $A_2$ represents an aromatic group having a valence of (2+m); Y is —O— or

in which $R_1$ is a hydrogen atom or a monovalent hydrocarbon residue; and the two nitrogen atoms bonded to $A_1$ are bonded to the ring carbon atoms at the orthoposition of the aromatic group $A_1$; l and m are identical or different and each represent an integer of 0 to 3; when Y is

and one of $W_1$ groups is bonded to the ring carbon atom at the ortho-position of the aromatic group $A_1$ together with Y, the $W_1$, Y and $A_1$ can form a 5-membered ring same as

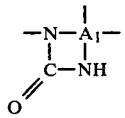

in which all symbols are the same as defined above; and when $W_1$ does not form the 5-membered ring, $W_1$ and $W_2$ are identical or different and represent at least one group selected from substituted nitrogen-containing groups derived from a primary amino group;

(2) coating the resulting polymer solution on a microporous substrate, and
(3) drying the coating to form an ultrathin film of the polymer on the microporous substrate.

2. The process of claim 1 wherein the imidazolone ring-containing aromatic polymer comprises at least 80 mole %, based on the entire recurring units, of the recurring unit of formula (I).

3. The process of claim 1 the imidazolone ring-containing aromatic polymer comprises
    (1) 30 to 100 mole %, based on the entire recurring units, of the recurring unit of formula (I); and
    (2) 0 to 70 mole %, based on the entire recurring units, of an unsubstituted or substituted amino-containing recurring unit of the following formula

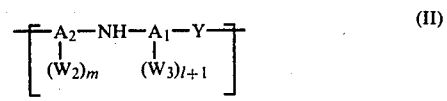

(II)

wherein $A_1$, $A_2$, Y, $W_2$, l and m and the dashed line are the same as defined in formula (I); and $W_3$ represents at least one group selected from the group consisting of a mono-substituted nitrogen-containing groups derived from the primary amino group, the total amount of the recurring units of formulae (I) and (II) being at least 80 mole %.

4. The process of claim 3 wherein the recurring unit of formula (II) is a recurring unit of the following formula

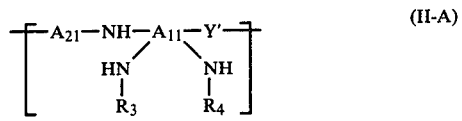

(II-A)

wherein $A_{11}$ represents a member selected from the group consisting of

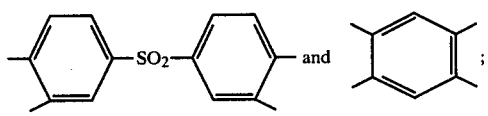

$A_{21}$ represents a member selected from the group consisting of

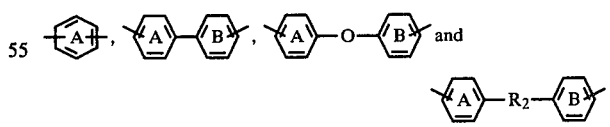

in which $R_2$ is a lower alkylene group, and the benzene ring A and/or B is optionally substituted by at least one member selected from the class consisting of lower alkyl groups, a carboxyl group and a sulfo group; and $R_3$ and $R_4$ reach represents a group selected from the group consisting of —COOR$_5$, —SO$_2$R$_5$, —COR$_5$ and —CONH—R$_5$ in which R$_5$ represents an organic group having up to 15 carbon atoms; and Y' represents —O— or —NH—.

5. The process of claim 1 wherein at least a part of the recurring units of formula (I) is recurring unit of the following formula

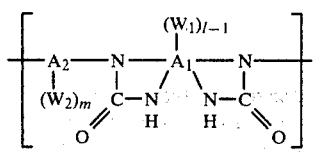

wherein $A_1$, $A_2$, $W_1$, $W_2$, $l$ and $m$ are as defined with regard to formula (I), with the proviso that $l-1 \leqq 0$.

6. The process of claim 1 wherein in formula (I), $A_1$ represents an aromatic group having a valence of $(3+l)$ and containing 6 to 20 carbon atoms and optionally including an inert substituent selected from the group consisting of lower alkyl groups and lower alkoxy groups in addition to the group $W_1$; and $A_2$ represents an aromatic group having a valence of $(2+m)$ and containing 6 to 20 carbon atoms and optionally including an inert substituent selected from the group consisting of lower alkyl groups, lower alkoxy groups, a carboxyl group and a sulfo group in addition to the group $W_2$.

7. The process of claim 1 wherein $W_1$ and $W_2$ in formula (I) each represents a member selected from the class consisting of a carbamide group, a sulfonamide group, a urea group and a urethane group.

8. The process of claim 1 wherein the recurring unit of formula (I) is a recurring unit of the following formula

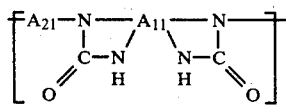

wherein $A_{11}$ represents a member selected from the group consisting of

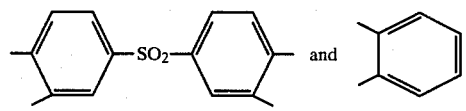

and $A_{21}$ represents a member selected from the group consisting of

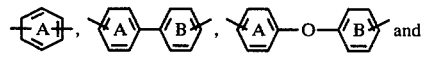

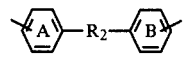

in which $R_2$ represents a lower alkyl group, and the benzene ring A and/or B is optionally substituted by at least one member selected from the group consisting of lower alkyl groups, a carboxyl group and a sulfo group.

9. The process of claim 1 wherein the aromatic polymer has an inherent viscosity, measured at 30° C. for an N-methylpyrrolidone solution in a concentration of 0.5 g/100 ml, of at least 0.1.

10. The process of claim 1 wherein the water-miscible amine has a pka of 5.1 to 12.

11. The process of claim 1 wherein the water-miscible amine represents a member selected from the group consisting of aliphatic amines of the formula

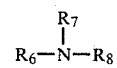

wherein $R_6$, $R_7$ and $R_8$ are identical or different and each represent a hydrogen atom, a lower alkyl group, a lower hydroxyalkyl group, or the group of the formula

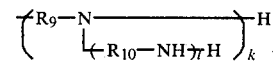

in which $R_9$ and $R_{10}$ each represent a lower alkylene group, k is an integer of 1 to 6, and l is 0 or an integer of 1 to 3, and when k is at least 2, the recurring units

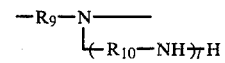

are identical or different, with the proviso that at least one of $R_6$, $R_7$ and $R_8$ represents the above groups other than hydrogen; and pyridine of the following formula

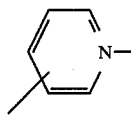

wherein $R_{11}$ represents a member selected from the group consisting of lower alkyl groups, lower alkoxy groups and amino groups, and j is 0 or an integer of 1 to 4.

12. The process of claim 1 wherein the water-miscible amine has a boiling point of not more than 200° C.

13. The process of claim 12 wherein the water-miscible amine has a boiling point of not more than 140° C.

14. The process of claim 1 wherein the water-miscible amine is selected from the group consisting of monomethylamine, dimethylamine, trimethylamine, monoethylamine, diethylamine, triethylamine, monoethanolamine, diethanolamine, ethylenediamine, diethylenetriamine, triethylenetetramine, propylenediamine, pyridine, 2-aminopyridine, 4-aminopyridine, 2,4-dimethylpyridine and 2,6-dimethylpyridine.

15. The process of claim 1 wherein the aqueous liquid medium contains the water-miscible amine in a concentration of 10 to 90% by weight.

16. The process of claim 1 wherein the aqueous liquid medium further comprises an aprotic polar organic solvent.

17. The process of claim 16 wherein the concentration of the aprotic polar organic solvent is at most 15% by weight.

18. The process of claim 16 wherein the concentration of the aprotic polar organic solvent is up to 10% by weight.

19. The process of claim 16 wherein the aprotic polar organic solvent is selected from the group consisting of N-methylpyrrolidone, N-methylcaprolactam, N,N-dimethylformamide, N,N-dimethyl acetamide, hexamethylphosphoramide, tetramethyleneurea, dimethyl sulfoxide and tetramethylenesulfone.

20. The process of claim 16 wherein the aprotic polar organic solvent has a boiling point of at least 140° C.

21. The process of claim 20 wherein the aprotic polar organic solvent has a boiling point of 145° to 240° C.

22. The process of claim 16, 20 or 21 wherein the aprotic polar organic solvent has a higher boiling point than the water-miscible amine.

23. The process of claim 1 wherein the polymer solution contains the aromatic polymer in a concentration of 0.05 to 15% by weight.

24. The process of claim 1 wherein the microporous substrate has a maximum pore size of not more than 5,000 Å and a thickness of 25 to 1,000 microns.

25. The process of claim 1 wherein the microporous substrate is a polysulfone substrate.

26. The process of claim 1 wherein the drying is carried out at room temperature to 250° C.

27. The process of claim 1 wherein the ultrathin film has a thickness of 100 to 10,000 Å.

28. A polymer solution comprising
(a) an aqueous liquid medium containing a water-miscible amine having a pka of more than 5.0 in a concentration of at least 5% by weight, and
(b) 0.01 to 20.0% by weight, based on the weight of solution, of an imidazolone ring-containing aromatic polymer, said polymer comprising at least 30 mole %, based on the entire recurring units, of at least one recurring unit of the following formula

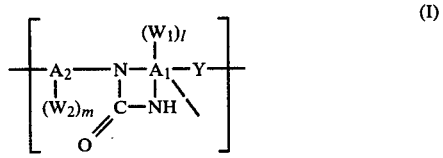 (I)

wherein $A_1$ is an aromatic group having a valence of $(3+l)$, the dashed line represents the presence or absence of a bond, and the two nitrogen atoms and $W_1$ are all bonded to the nuclear carbon atoms of the aromatic group $A_1$; $A_2$ represents an aromatic group having a valence of $(2+m)$; Y is —O— or

in which $R_1$ is a hydrogen atom or a monovalent hydrocarbon residue; and the two nitrogen atoms bonded to $A_1$ are bonded to the ring carbon atoms at the ortho-position of the aromatic group $A_1$; l and m are identical or different and each represent an integer of 0 to 3; when Y is

and one of $W_1$ groups is bonded to the ring carbon atom at the ortho-position of the aromatic group $A_1$ together with Y, the $W_1$, Y and $A_1$ can form a 5-membered ring same as

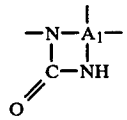

in which all symbols are the same as defined above; and when $W_1$ does not form the 5-membered ring, $W_1$ and $W_2$ are identical or different and represent at least one group selected from mono-substituted nitrogen-containing groups derived from a primary amino group.

29. The polymer solution of claim 28 wherein the aqueous liquid medium contains at most 15% by weight, based on the aqueous liquid medium, of an aprotic organic polar solvent.

* * * * *

UNITED STATES PATENT AND TRADEMARK OFFICE
CERTIFICATE OF CORRECTION

PATENT NO. : 4,260,652
DATED : APRIL 7, 1981
INVENTOR(S) : TAKETANI, ET AL.

It is certified that error appears in the above—identified patent and that said Letters Patent is hereby corrected as shown below:

Claim 3, in the formula, extend a dashed line downward at an angle from $A_1$, as shown.

Claim 4, line 1 in the formula, delete "NH" and insert -- HN --

Claim 10, line 2, delete "pka" and insert -- pKa --

Claim 28, line 2, delete "pka" and insert -- pKa --

Signed and Sealed this

Twenty-third Day of June 1981

[SEAL]

Attest:

RENE D. TEGTMEYER

Attesting Officer

Acting Commissioner of Patents and Trademarks